(12) United States Patent
Kumar et al.

(10) Patent No.: US 11,645,095 B2
(45) Date of Patent: May 9, 2023

(54) GENERATING AND UTILIZING A DIGITAL KNOWLEDGE GRAPH TO PROVIDE CONTEXTUAL RECOMMENDATIONS IN DIGITAL CONTENT EDITING APPLICATIONS

(71) Applicant: Adobe Inc., San Jose, CA (US)

(72) Inventors: Jayant Kumar, San Jose, CA (US); Manasi Deshmukh, San Francisco, CA (US); Ming Liu, Sunnyvale, CA (US); Ashok Gupta, San Jose, CA (US); Karthik Suresh, San Jose, CA (US); Chirag Arora, San Jose, CA (US); Jing Zheng, San Jose, CA (US); Ravindra Sadaphule, San Jose, CA (US); Vipul Dalal, Cupertino, CA (US); Andrei Stefan, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 17/475,145

(22) Filed: Sep. 14, 2021

(65) Prior Publication Data
US 2023/0080407 A1    Mar. 16, 2023

(51) Int. Cl.
*G06F 9/451* (2018.01)
*G06F 40/20* (2020.01)
(Continued)

(52) U.S. Cl.
CPC .............. *G06F 9/453* (2018.02); *G06F 40/20* (2020.01); *G06N 5/022* (2013.01); *G06T 11/60* (2013.01)

(58) Field of Classification Search
CPC ......... G06F 9/453; G06F 40/20; G06N 5/022; G06T 11/60
See application file for complete search history.

(56) References Cited

U.S. PATENT DOCUMENTS

2013/0266922 A1* 10/2013 Needham ................. G09B 5/00
434/350
2017/0220652 A1*  8/2017 Kazi ................. G06F 16/24578
(Continued)

OTHER PUBLICATIONS

"Adobe Help Center"; Date downloaded Sep. 27, 2021 https://helpx.adobe.com/support.html.
(Continued)

*Primary Examiner* — Phenuel S Salomon
(74) *Attorney, Agent, or Firm* — Keller Preece PLLC

(57) ABSTRACT

This disclosure describes methods, non-transitory computer readable storage media, and systems that generate a digital knowledge graph based on a plurality of tutorial content items to generate recommendations of digital resource items. Specifically, the disclosed system extracts a plurality of tasks, subject categories related to the tasks, and context signals related to an environment for the tasks from a plurality of tutorial content items for one or more digital content editing applications. The disclosed system generates a digital knowledge graph including nodes corresponding to the tasks and subject categories connected via edges based on relationships extracted from the tutorial content items. In some embodiments, the disclosed system also includes nodes corresponding to digital resource items in the digital knowledge graph or in a subgraph. The disclosed system utilizes the digital knowledge graph with context data to provide a recommendation of digital resource items for display at a client device.

20 Claims, 13 Drawing Sheets

(51) Int. Cl.
*G06N 5/022* (2023.01)
*G06T 11/60* (2006.01)

(56) References Cited

U.S. PATENT DOCUMENTS

| | | | | |
|---|---|---|---|---|
| 2017/0235848 A1* | 8/2017 | Van Dusen | ............ | G06N 5/02 705/12 |
| 2018/0189634 A1* | 7/2018 | Abdelaziz | ................ | G06N 3/04 |
| 2019/0392330 A1* | 12/2019 | Martineau | ............. | G06N 20/00 |
| 2020/0159507 A1* | 5/2020 | Bodin | ................. | G06F 11/3466 |
| 2020/0401908 A1* | 12/2020 | Ortega | ................ | G06K 9/6261 |
| 2021/0007023 A1* | 1/2021 | Umapathy | ...... | H04W 36/00837 |

OTHER PUBLICATIONS

Snorkel.org; "Tutorials"; Date downloaded Sep. 27, 2021; https://www.snorkel.org/use-cases/.

Mean reciprocal rank; Wikipedia.org; Date downloaded Sep. 27, 2021 https://en.wikipedia.org/wiki/Mean_reciprocal_rank.

NLP-progress—Repository to track the progress in Natural Language Processing (NLP), including the datasets and the current state-of-the-art for the most common NLP tasks; Date downloaded Sep. 27, 2021; http://nlpprogress.com/english/relation_prediction.html.

Trouillon; Theo et al.; "Complex Embeddings for Simple Link Prediction"; Jun. 19, 2016; http://proceedings.mlr.press/v48/trouillon16.pdf.

Zhang; Daokun et al.; "Attributed Network Embedding via Subspace Discovery"; May 20, 2019; https://arxiv.org/pdf/1901.04095.pdf.

AmpliGraph; Github; Date downloaded Sep. 27, 2021; https://github.com/Accenture/AmpliGraph.

Stellargraph; Github; Date downloaded Sep. 27, 2021; https://github.com/stellargraph/stellargraph.

SpaCy; "Industrial-Strength Natural Language Processing in Python"; Date downloaded Sep. 27, 2021; https://spacy.io.

Fast Text—Library for efficient text classification and representation learning; Date downloaded Sep. 27, 2021; https://fasttext.cc.

* cited by examiner

GENERATING AND UTILIZING A DIGITAL KNOWLEDGE GRAPH TO PROVIDE CONTEXTUAL RECOMMENDATIONS IN DIGITAL CONTENT EDITING APPLICATIONS

BACKGROUND

Advances in computer processing and machine learning have led to significant advancements in the field of digital content generation and editing. Specifically, many systems provide digital content editing applications with a large number of different tools to perform a variety of operations. For instance, many systems provide tools, panels, and settings to generate and modify digital images, digital video, and digital text for creating different types of digital resource items. Properly selecting and utilizing each tool, panel, or setting to achieve a particular result in each digital content editing application poses a difficult challenge for conventional systems, particularly when operations to achieve the desired result involve numerous—and sometimes complex—steps involving a plurality of tools, panels, or settings. Additionally, selecting the appropriate digital assets (e.g., images, fonts, colors, themes, templates) for a particular digital resource item is an important aspect of generating digital content.

SUMMARY

This disclosure describes one or more embodiments of methods, non-transitory computer readable media, and systems that solve the foregoing problems (in addition to providing other benefits) by generating a creative knowledge graph based on a plurality of tutorial content items to generate recommendations of digital resource items. Specifically, the disclosed systems extract a plurality of tasks, subject categories related to the tasks, and context signals related to an environment for the tasks from a plurality of tutorial content items for one or more digital content editing applications. The disclosed systems can map this contextual information to a creative task and utilize the predicted creative task to recommend tutorials or other digital resource items to a client devices. In particular, the disclosed systems can generate a digital creative knowledge graph including nodes corresponding to the tasks, subject categories, and context signals connected via edges based on relationships extracted from the tutorial content items. In some embodiments, the disclosed systems also include nodes corresponding to digital resource items in the digital knowledge graph or in a subgraph. The disclosed systems utilize the digital knowledge graph with context data during use of a digital content editing application to provide a recommendation of digital resource items such as tutorial content items or digital assets for display at a client device. Accordingly, the disclosed systems provide improved flexibility and accuracy in generating recommendations of digital resource items during digital content creation.

BRIEF DESCRIPTION OF THE DRAWINGS

The detailed description refers to the drawings briefly described below.

DETAILED DESCRIPTION

Figure 1:
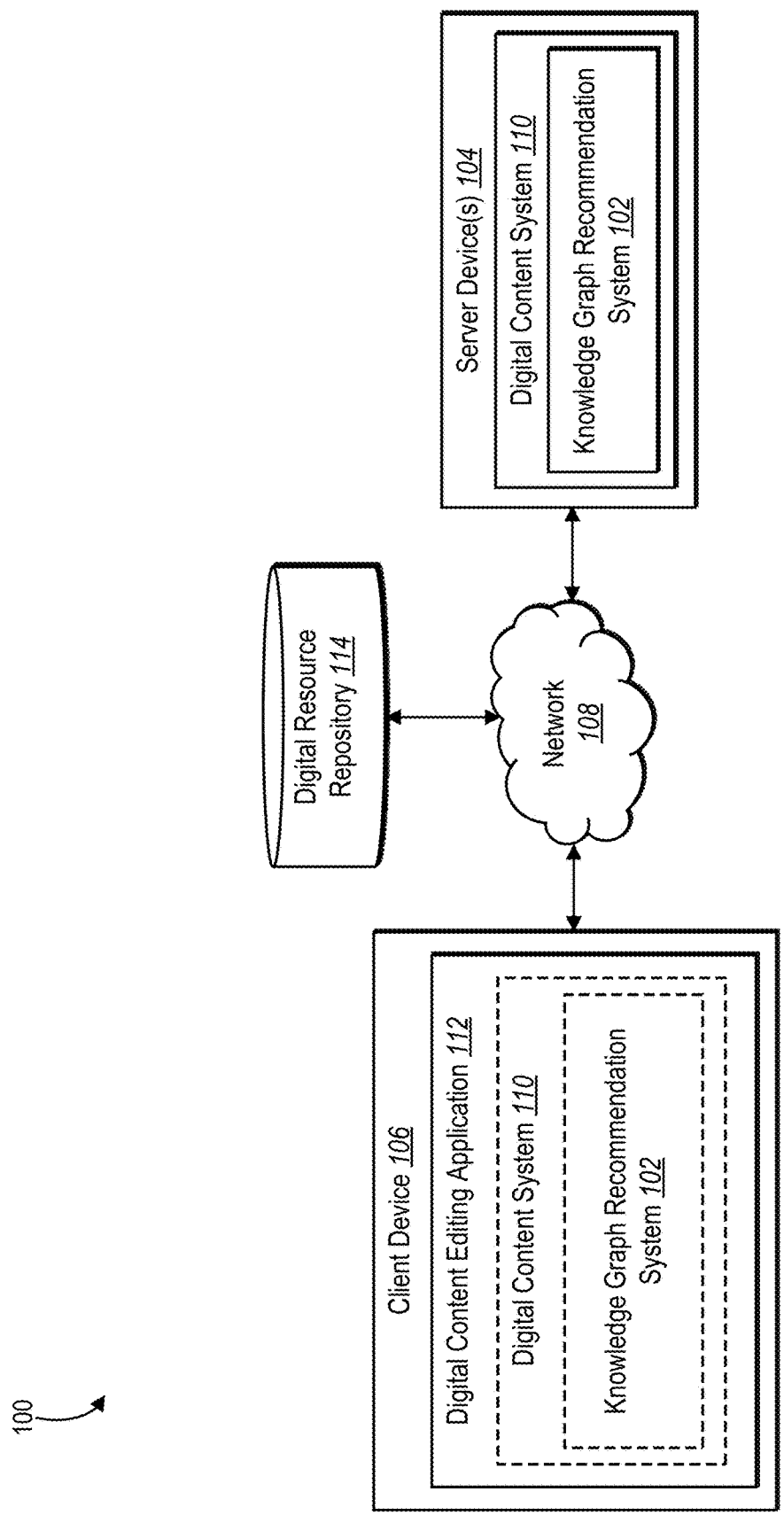
FIG. 1 illustrates a block diagram of a system environment in which a knowledge graph recommendation system is implemented in accordance with one or more implementations.

This disclosure describes one or more embodiments of a knowledge graph recommendation system that generates a digital knowledge graph from tutorial content items for providing recommendations during use of a digital content editing application. In one or more embodiments, the knowledge graph recommendation system utilizes natural language processing to extract information from a plurality of tutorial content items that provide assistance for performing tasks or include product documentation for products, topics, learning approaches in one or more digital content editing applications. Additionally, the knowledge graph recommendation system generates a digital knowledge graph including nodes representing the extracted information and edges connecting the nodes indicating relationships between extracted data points. The knowledge graph recommendation system then utilizes the digital knowledge graph to map client device context signals to a creative task and then generate recommendations of digital resource items (e.g., tutorial content items or digital assets) for display at a client device.

As mentioned, in one or more embodiments, the knowledge graph recommendation system extracts information from a plurality of tutorial content items. In particular, the knowledge graph recommendation system utilizes natural language processing to extract a plurality of tasks from tutorial content items that provide assistance on performing the tasks. For example, the knowledge graph recommendation system first classifies the tutorial content items based on whether the corresponding tasks discussed in the tutorial content items are creative tasks (e.g., issues related to using specific tools of a digital content editing application) or non-creative tasks (e.g., issues unrelated to using specific tools of a digital content editing application). The knowledge graph recommendation system then utilizes natural language processing to extract the tasks (e.g., the creative tasks) from the corresponding tutorial content items.

In one or more embodiments, the knowledge graph recommendation system also extracts additional information related to extracted tasks from the tutorial content item. Specifically, the knowledge graph recommendation system extracts task matters indicating subject categories of the corresponding tasks from the tutorial content items. By determining task matters for the extracted tasks, the knowledge graph recommendation system determines the primary subject matter of the task. In addition to extracting task matters from the tutorial content items, the knowledge graph recommendation system extracts context signals from the tutorial content items that capture characteristics of environments for performing the tasks. To illustrate, the context signals provide additional understanding of aspects such as purpose of a task, digital asset type applicable to the task, tools (or panels/menu items) used to perform the task, skill level associated with the task, or other information.

In one or more additional embodiments, the knowledge graph recommendation system generates a digital knowledge graph representing the information extracted from the tutorial content items. In particular, the knowledge graph recommendation system generates a plurality of nodes to represent the extracted information from the tutorial content items. For instance, the knowledge graph recommendation system generates nodes representing tasks, task matters, document types, tools, etc. The knowledge graph recommendation system also generates edges between the nodes to indicate relationships between the concepts associated with the nodes based on the information extracted from the tutorial content items.

According to one or more additional embodiments, the knowledge graph recommendation system generates one or more subgraphs associated with the digital knowledge graph for one or more digital content editing applications or systems. To illustrate, the knowledge graph recommendation system generates a subgraph to connect a plurality of digital resource items such as tutorial content items, images, fonts, colors, themes, templates, etc., to a plurality of tasks. More specifically, the knowledge graph recommendation system generates nodes for the digital resource items and then connects nodes for the plurality of tasks to the nodes of the digital resource items via a plurality of edges indicating relationships between the tasks and digital resource items in a separate subgraph.

After the knowledge graph recommendation system has generated a digital knowledge graph (and one or more subgraphs), the knowledge graph recommendation system utilizes the digital knowledge graph to generate a recommendation for display at a client device. In one or more embodiments, the knowledge graph recommendation system obtains context data for user inputs in a digital content editing application. The knowledge graph recommendation system then uses a task prediction model to predict one or more tasks based on the context data and the digital knowledge graph. For example, the knowledge graph recommendation system utilizes the task prediction model to obtain feature representations of the context data and compare the feature representations to feature representation data stored in the digital knowledge graph to determine the predicted task.

In some embodiments, the knowledge graph recommendation system also generates a recommendation of a digital resource item. Specifically, the knowledge graph recommendation system utilizes a predicted task to generate a recommendation of a tutorial content item to provide for display at a client device. In one or more embodiments, the knowledge graph recommendation system utilizes the predicted task to determine one or more digital resource items based on a subgraph associated with the digital knowledge graph. In one or more alternative embodiments, the knowledge graph recommendation system utilizes the predicted task to determine one or more digital resource items based on a predetermined or ranked set of digital resource items associated with the predicted task.

Conventional digital content systems have a number of shortcomings in relation to accuracy, efficiency, and flexibility of operation. For example, many existing digital content systems provide assistance to users of the systems via tutorial articles, videos, or other documents. While such tutorial items often provide users with useful, and often detailed, information for performing specific operations, the existing systems typically manage such tutorial items inefficiently. In particular, the existing systems require numerous user interactions to search for tutorial items in a database of tutorial items. Such inefficient processes take a considerable amount of time and computer resources in conducting searches and navigating through various user interfaces.

Additionally, this approach also often requires numerous digital content editing application (e.g., conventional systems open up a separate application (e.g., a web browser) to access the tutorial items). Alternatively, systems that utilize in-application tutorial searches sometimes open a separate dialog window to provide search results for tutorial items. Conventional systems switch back and forth from the digital content editing application and the separate window or application to provide the tutorial items while also performing the steps from the tutorial items. This rigid approach to utilizing multiple windows or applications undermines system flexibility and efficiency.

Furthermore, conventional systems that utilize search engines based on tags and keywords to find tutorial items often lack accuracy when providing results. To illustrate, the conventional systems lack understanding of tasks and concepts that are conceptually similar in nature. Thus, conventional systems that utilize tag and keyword searches often miss items by failing to search for concepts related to the search terms—and even conceptually covered by the search terms—if not explicitly indicated in the search terms. Accordingly, the conventional systems sometimes fail to return accurate results for searches due to the inability to identify important contextual information in the search terms.

The disclosed knowledge graph recommendation system provides a number of advantages over conventional systems. For example, the knowledge graph recommendation system improves the efficiency of computing systems that provide assistance or digital resources in connection with digital content generation and editing. Specifically, in contrast to conventional systems, the knowledge graph recommendation system provides intelligent contextual recommendations. More specifically, by utilizing a digital knowledge graph based on a plurality of tutorial content items to provide recommendations of digital resource items to users, the knowledge graph recommendation system learns contextual information in which client devices are operating to provide in-application recommendations. Thus, the knowledge graph recommendation system eliminates or reduces the need for multiple interfaces or applications to discover digital resource items.

The knowledge graph recommendation system also improves the accuracy of computing systems that provide access to tutorial content items and other digital resource items. In particular, the knowledge graph recommendation system extracts information about tasks and corresponding context signals from tutorial content items to generate a digital knowledge graph. By utilizing such a digital knowledge graph to generate contextual recommendations for digital resource items, the knowledge graph recommendation system accurately interprets the intent/purpose of a user and a task to achieve the intent/purpose. This allows the knowledge graph recommendation system to more accurately provide digital resource items in generating digital content.

Additionally, the knowledge graph recommendation system provides improved flexibility over conventional digital content systems. For instance, by generating a digital knowledge graph based on tutorial content items for tasks and concepts associated with a variety of digital content editing applications, the knowledge graph recommendation system can provide accurate and timely recommendations across the different digital content editing applications. To illustrate, knowledge graph recommendation system captures contextual information associated with use of each digital content editing application and then utilizes the digital knowledge graph to determine one or more tasks for the corresponding use. By utilizing such contextual information to determine tasks associated with use of digital content editing applications, the knowledge graph recommendation system flexibly provides consistent and accurate in-application recommendation across the different content editing applications.

Turning now to the figures, FIG. 1 includes an embodiment of a system environment 100 in which a knowledge graph recommendation system 102 is implemented. In particular, the system environment 100 includes server device(s) 104 and a client device 106 in communication via a network 108. Moreover, as shown, the server device(s) 104 include a digital content system 110, which includes the knowledge graph recommendation system 102. Additionally, the client device 106 includes a digital content editing application 112, which optionally includes the digital content system 110, the knowledge graph recommendation system 102. In one or more embodiments, as illustrated in FIG. 1, the system environment 100 also includes a digital resource repository 114 in communication with the server device(s) 104 and the client device 106 via the network 108.

As shown in FIG. 1, the server device(s) 104 includes or hosts the digital content system 110. Specifically, the digital content system 110 includes, or is part of, one or more systems that implement digital content generation and editing. For example, the digital content system 110 provides tools for viewing, generating, editing, and/or otherwise interacting with digital content (e.g., digital images, digital videos, digital text documents, digital audio documents) via the digital content editing application 112 of the client device 106. In one or more embodiments, the digital content system 110 processes digital content items including digital images, digital videos, digital text, or digital audio. To illustrate, the digital content system 110 generates and/or modifies digital content items in response to interactions received via the client device 106. In response to generating or modifying digital content items, the digital content system 110 provides the modified digital content items for display at the client device 106. Alternatively, the generation and/or modification of digital content items occurs at the client device, and the client device 106 sends the digital content items to the digital content system 110 for storing and access in connection with one or more additional systems such as cloud-storage systems. In one or more embodiments, the digital content system 110 provides access to digital content items across a plurality of digital content editing applications and/or client devices.

In connection with generating or modifying digital content items, the digital content system 110 includes the knowledge graph recommendation system 102 to generate recommendations of digital resource items for display at the client device 106. In particular, the knowledge graph recommendation system 102 processes a plurality of tutorial content items from the digital resource repository 114 to generate a digital knowledge graph. The knowledge graph recommendation system 102 constructs the digital knowledge graph to include information about concepts identified in the tutorial content items and relationships between the concepts. More specifically, the knowledge graph recommendation system 102 generates the digital knowledge graph to determine a plurality of tasks from the tutorial content items and capture relationships between the tasks and important contextual information for understanding the tasks and environments in which users/devices perform the tasks.

According to one or more embodiments, a digital knowledge graph includes a graph-structured data model that includes nodes and edges. For example, a digital knowledge graph is based on a set of nodes relating to concepts extracted from a plurality of tutorial content items. Accordingly, the knowledge graph recommendation system 102 generates the digital knowledge graph to include nodes representing tasks and context signals related to the tasks. Furthermore, to generate the digital knowledge graph, the knowledge graph recommendation system 102 generates edges connecting the task nodes and context signal nodes based on relationships identified in the tutorial content items.

In one or more embodiments, a task includes one or more operations to achieve a result for generating or editing digital content. To illustrate, a task includes one or more operations for generating or modifying text, images, video, or audio within a particular digital content editing application (e.g., the digital content editing application 112). For example, a task includes a sequence of operations using one or more tools of a digital content editing application such as, but not limited to, modifying certain visual aspects of an image (e.g., brightening the background, removing an object, or filling in a blank or distorted region of a digital image). Additionally, in one or more embodiments, a task includes, but is not limited to, achieving a result such as creating a specific theme for digital content.

In some embodiments, context signal nodes include nodes representing characteristics of an environment in which a task is performed. Examples of context signal nodes include, but are not limited to, task matters (e.g., subject categories corresponding to tasks), document types related to tasks, tools for performing tasks, menu items related to tasks, skill levels related to tasks, tags indicating objects or visual elements, or taxonomy labels.

In one or more embodiments, tutorial content items include digital documents or digital files including information for performing one or more tasks in connection with a digital content editing application (e.g., the digital content editing application 112). For example, a tutorial content item includes a text file, a digital image file, a digital video file, or a digital audio file including information on how to perform a task or sequence of tasks to achieve a particular result in digital content generation or editing. To illustrate, tutorial content items can provide descriptions on how to utilize tools in an image editing program, text editing program, or video editing program, etc.

In one or more additional embodiments, the knowledge graph recommendation system 102 generates one or more subgraphs related to one or more different environments to associate different resource items to specific tasks. For instance, the knowledge graph recommendation system 102 generates a subgraph associated with a particular digital content editing application or type of digital resource item by adding a plurality of nodes and edges to relate digital resource items of the specific type to task nodes from the digital knowledge graph. For example, the knowledge graph recommendation system 102 generates one or more subgraphs for associating tutorial content items, digital images, digital videos, digital audio clips, or digital fonts with specific tasks. A subgraph can be implemented part of a larger knowledge graph or as a separate knowledge graph.

After generating a digital knowledge graph based on tutorial content items from the digital resource repository 114, in one or more embodiments, the knowledge graph recommendation system 102 generates recommendations of digital resource items to provide for display at the client device 106. For instance, the knowledge graph recommendation system 102 utilizes the digital knowledge graph to generate recommendations of specific tutorial content items from the digital resource repository 114 to provide for display at the client device 106 (e.g., via the digital content editing application 112). In additional embodiments, the knowledge graph recommendation system 102 also utilizes one or more subgraphs to generate recommendations of tutorial content items or other digital resource items. For example, the knowledge graph recommendation system 102 utilizes context data received from the client device 106 (e.g., based on user inputs via the digital content editing application 112) to predict one or more tasks via the digital knowledge graph. The knowledge graph recommendation system 102 then utilizes the predicted task to generate a recommendation of one or more digital resource items via a subgraph associated with the digital knowledge graph.

In one or more embodiments, the server device(s) 104 include a variety of computing devices, including those described below with reference to FIG. 8. For example, the server device(s) 104 includes one or more servers for storing and processing data associated with digital content and digital resource items. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 8. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, generating, viewing, modifying, and otherwise interacting with digital content via the digital content editing application 112. The client device 106 also performs functions for generating, capturing, or accessing data related to digital content editing to provide to the digital content system 110 and the knowledge graph recommendation system 102 in connection with generating and modifying digital content. For example, the client device 106 communicates with the server device(s) 104 via the network 108 to provide digital content and context data associated with the digital content or user interactions to the server device(s) 104 or receive recommendations from the server device(s) 104.

Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 8.

Although FIG. 1 illustrates the server device(s) 104, the client device 106, and the digital resource repository 114 communicating via the network 108, in alternative embodiments, the various components of the knowledge graph recommendation system 102 communicate and/or interact via other methods (e.g., the server device(s) 104, the client device 106, and/or the digital resource repository 114 can communicate directly). Furthermore, although FIG. 1 illustrates the knowledge graph recommendation system 102 being implemented by a particular component and/or device within the system environment 100, the knowledge graph recommendation system 102 can be implemented, in whole or in part, by other computing devices and/or components in the system environment 100 (e.g., the client device 106). In some embodiments, the digital resource repository 114 is incorporated within the server device(s) 104 or the client device 106. Alternatively, the server device(s) 104 and/or the client device 106 may access digital resource items from a third-party system including the digital resource repository 114 via the network 108.

In particular, in some implementations, the knowledge graph recommendation system 102 on the server device(s) 104 supports the knowledge graph recommendation system 102 on the client device 106. For instance, the knowledge graph recommendation system 102 on the server device(s) 104 utilizes one or more models to generate a digital knowledge graph. The knowledge graph recommendation system 102 then, via the server device(s) 104, provides the digital knowledge graph to the client device 106 to generate recommendations of digital resource items for display at the client device 106. In other words, the client device 106 obtains (e.g., downloads) the digital knowledge graph from the server device(s) 104 and utilizes the digital knowledge graph to generate recommendations independently from the server device(s) 104.

In alternative embodiments, the knowledge graph recommendation system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital content editing and resource recommendations utilizing the digital knowledge graph, and, in response, the knowledge graph recommendation system 102 on the server device(s) 104 performs the task. The server device(s) 104 then provide the output or results of the tasks to the client device 106.

Figure 2A:
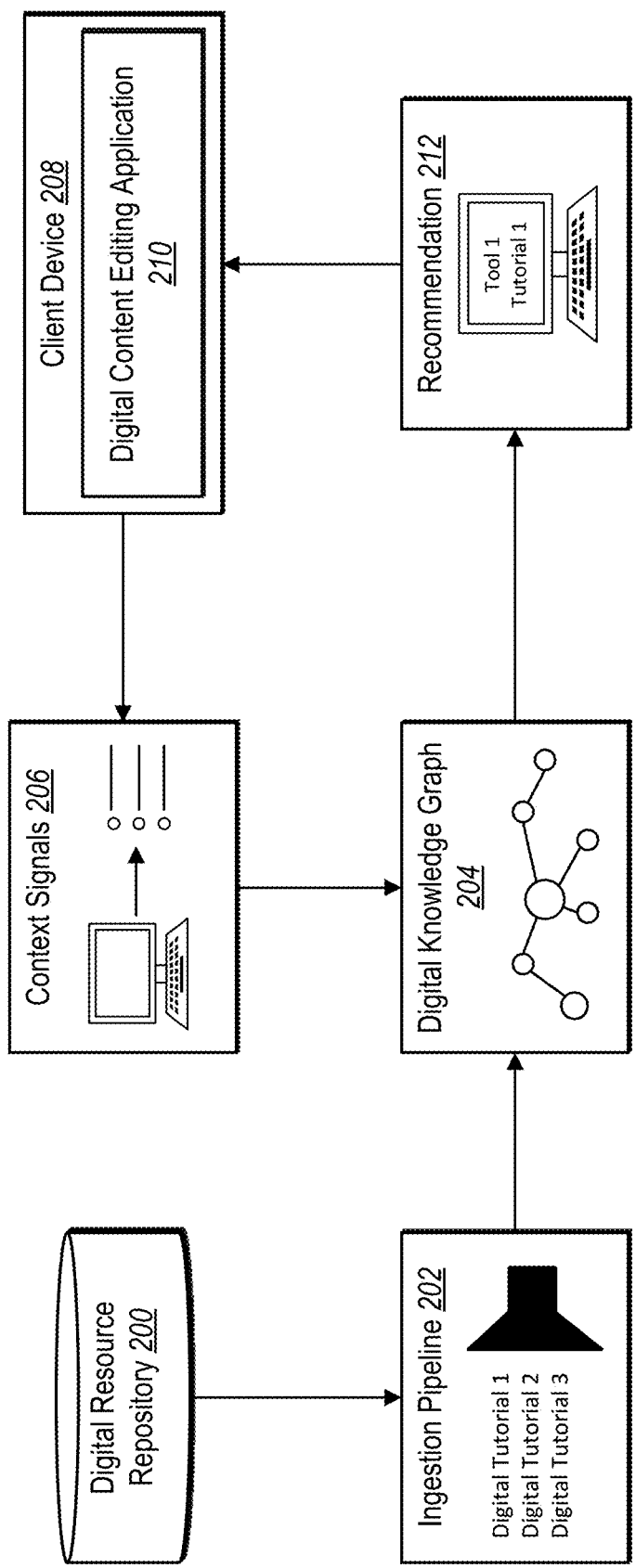
FIGS. 2A-2B illustrate diagrams of the knowledge graph recommendation system generating and utilizing a digital knowledge graph for recommending digital resource items in accordance with one or more implementations.
Figure 2B:
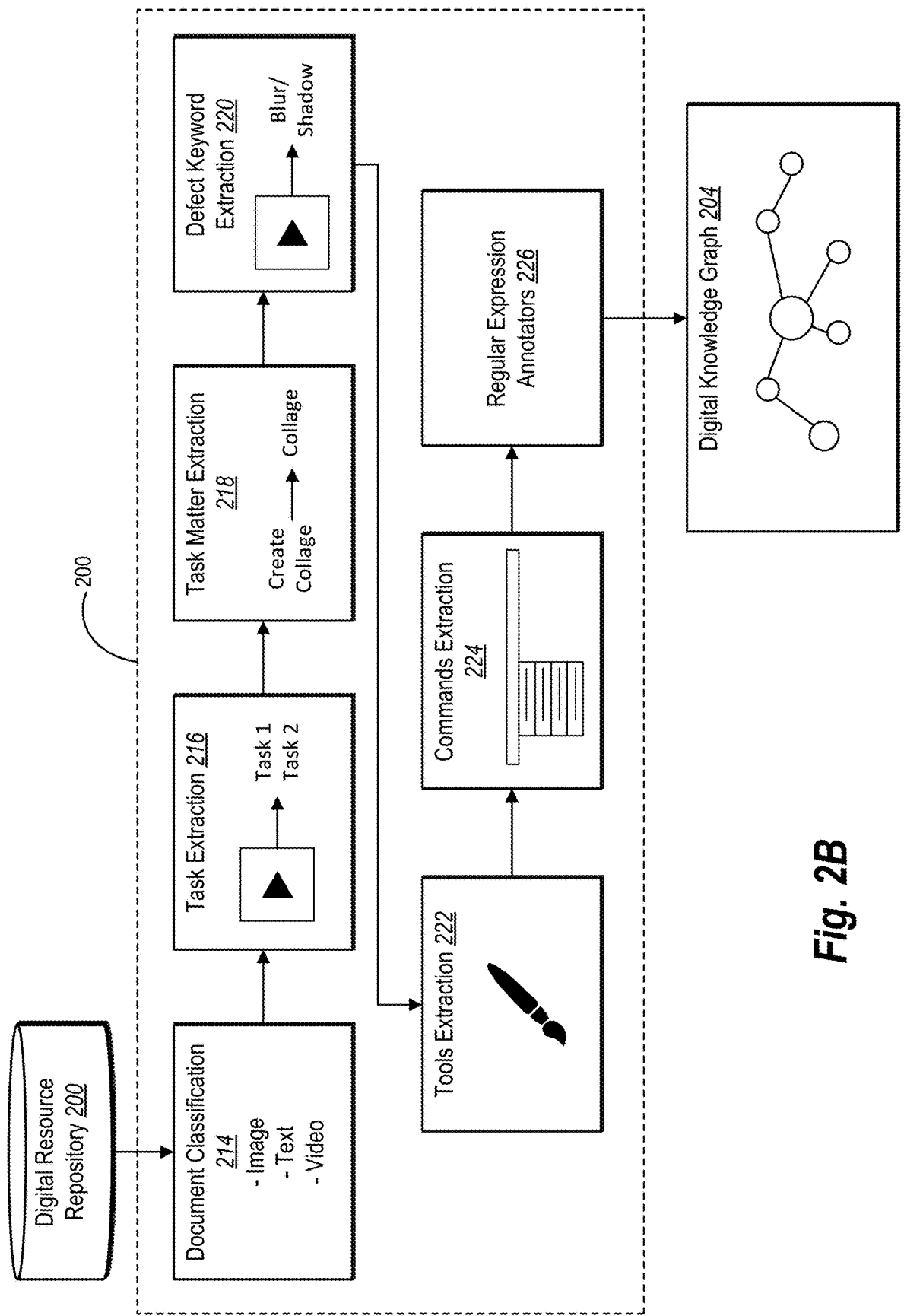

As mentioned, the knowledge graph recommendation system 102 generates a knowledge graph to provide accurate and efficient recommendations of digital resource items for one or more digital content editing applications. As illustrated in FIGS. 2A-2B, the knowledge graph recommendation system 102 generates a digital knowledge graph based on information extracted from tutorial content items. Specifically, FIG. 2A illustrates an overview of a process in which the knowledge graph recommendation system 102 generates recommendations based on a digital knowledge graph constructed from tutorial content items. FIG. 2B illustrates an overview of a process of the knowledge graph recommendation system 102 generating the digital knowledge graph from tutorial content items.

As mentioned, FIG. 2A illustrates that the knowledge graph recommendation system 102 extracts information from a plurality of tutorial content items. In one or more embodiments, the knowledge graph recommendation system 102 obtains the tutorial content items from a digital resource repository 200 in connection with one or more digital content editing applications. For example, the knowledge graph recommendation system 102 obtains tutorial content items from a source associated with the one or more digital editing applications such as a server including tutorial articles and/or videos. In some embodiments, the knowledge graph recommendation system 102 accesses tutorial content items from a plurality of different sources such as third-party video sites or other third-party sites.

In response to accessing the tutorial content items from the digital resource repository 200, the knowledge graph recommendation system 102 processes the tutorial content items via an ingestion pipeline 202 to extract information from the tutorial content items. In particular, the knowledge graph recommendation system 102 utilizes one or more content processing models such as, but not limited to, a natural language processing model to extract concepts (e.g., tasks and context signals) from the tutorial content items. Additionally, the knowledge graph recommendation system 102 determines relationships between the various concepts in the tutorial content items.

Based on the extracted information from the tutorial content items of the digital resource repository 200, the knowledge graph recommendation system 102 generates a digital knowledge graph 204. In one or more embodiments, the knowledge graph recommendation system 102 generates a plurality of nodes representing the concepts extracted from the tutorial content items. The knowledge graph recommendation system 102 also determines edges between the nodes representing the extracted relationships between the corresponding concepts. In some embodiments, the knowledge graph recommendation system 102 also generates one or more subgraphs in (or otherwise associated with) the digital knowledge graph 204 to associate digital resource items with a plurality of tasks.

In one or more additional embodiments, the knowledge graph recommendation system 102 utilizes contextual information based on user interactions with one or more digital content editing applications to provide recommendations of digital resource items. For example, the knowledge graph recommendation system 102 receives (or otherwise obtains) context signals 206 from a client device 208 (e.g., via a digital content editing application 210) to generate a recommendation 212. Specifically, the knowledge graph recommendation system 102 determines context signals 206 corresponding to digital content generated and/or edited using the digital content editing application 210 at the client device 208. To illustrate, the knowledge graph recommendation system 102 obtains context signals indicating characteristics of the environment associated with generating/editing the digital content such as based on the digital content, digital content editing application 210, user inputs, etc.

According to one or more embodiments, the knowledge graph recommendation system 102 utilizes the context signals to generate a recommendation 212 to provide to the client device 208. In particular, the knowledge graph recommendation system 102 processes the context signals with the digital knowledge graph to determine digital resource items to recommend to the client device 208. For instance, the knowledge graph recommendation system 102 utilizes a task prediction model to predict one or more tasks based on the context signals 206 and the digital knowledge graph 204. Furthermore, the knowledge graph recommendation system 102 utilizes the predicted task(s) to determine one or more digital resource items such as tutorial content items and/or digital assets. The knowledge graph recommendation system 102 then provides the recommendation to the client device 208 (e.g., for display within an interface of the digital content editing application 210).

As previously mentioned, in one or more embodiments, the knowledge graph recommendation system 102 extracts a plurality of different concepts from tutorial content items to generate a digital knowledge graph. FIG. 2B illustrates a plurality of operations in the ingestion pipeline 202 shown in FIG. 2A to extract the concepts from the plurality of tutorial content items. Specifically, for a plurality of tutorial content items in the digital resource repository 200, the knowledge graph recommendation system 102 performs a plurality of operations to extract a number of different concepts and relationships between the different concepts via the ingestion pipeline 202. The knowledge graph recommendation system 102 then utilizes the extracted concepts and relationships to generate the digital knowledge graph 204.

In one or more embodiments, the knowledge graph recommendation system 102 includes an operation for document classification 214 in the ingestion pipeline 202. For instance, the digital resource repository 200 can include a number of different types of digital resources. To illustrate, the digital resource repository includes tutorial content items (or portions of tutorial content items) related to various categories of tutorial content items. In one or more embodiments, a first category of tutorial content items relates to creative tasks, and a second category of tutorial content items relates to non-creative tasks.

More specifically, tutorial content items that include portions related to creative tasks describe one or more operations related to generating or modifying digital content. For example, tutorial content items related to creative tasks include operations for using various tools to insert, remove, or modify digital content in a digital content editing application. To illustrate, the knowledge graph recommendation system 102 utilizes a text-based classifier to classify text portions (e.g., phrases, sentences, paragraphs, tutorial content items) as being related to creative tasks such as how to smooth skin or remove skin blemishes or how to make a poster with a sports theme in a digital image editing application. In one or more embodiments, the text-based classifier includes a dependency parsing model that utilizes natural language processing to extract terms or key phrases representing the first category of tasks from titles, descriptions, text content, audio content, visual content, or metadata of the tutorial content items. Thus, the knowledge graph recommendation system 102 can train the text-based classifier (e.g., a machine learning model such as a neural network or decision tree) as a supervised learning task (e.g., utilizing a library such as Snorkel). In particular, the knowledge graph recommendation system 102 can train the text-based classifier by predicting creative and non-creative tasks and comparing the prediction to a ground truth label (e.g., utilizing a loss function) to train the text-based classifier. The knowledge graph recommendation system 102 utilizes the text-based classifier to determine a probability that a particular tutorial content item (or portion of a tutorial content item) includes a creative task.

Additionally, tutorial content items that include portions related to non-creative tasks describe one or more operations unrelated (or tangentially related) to creating or modifying digital content. For instance, tutorial content items related to non-creative tasks include operations for troubleshooting elements of a digital content editing application. To illustrate, the knowledge graph recommendation system 102 utilizes the text-based classifier to classify text portions as being related to non-creative tasks such as troubleshooting interactions between the digital content editing application and one or more software, firmware, or hardware components of a client device (e.g., troubleshooting a digital image editing application for a particular graphics driver, processor, device, or operating system). In a comparison of the generated results to ground truth classifications (i.e., manually labeled documents), the knowledge graph recommendation system 102 achieved an accuracy of 86.2% out of 200.

In some embodiments, once the knowledge graph recommendation system 102 has categorized tutorial content items being related to creative and/or non-creative tasks based on the contents of the tutorial content items, the knowledge graph recommendation system 102 extracts concepts from the tutorial content items (or portions of the tutorial content items) related to creative tasks. For example, as illustrated in FIG. 2B, the knowledge graph recommendation system 102 utilizes an operation for task extraction 216 to extract specific tasks from the tutorial content items. In some embodiments, the knowledge graph recommendation system 102 utilizes the natural language model to parse text in the tutorial content items to identify words and phrases that indicate the tasks. In additional embodiments, the knowledge graph recommendation system 102 extracts the task information from metadata associated with the tutorial content items based on tags or descriptions in the metadata.

In one or more embodiments, the knowledge graph recommendation system 102 utilizes the natural language model to extract a dependency tree from a tutorial content item. For instance, the natural language model processes phrases or sentences in the tutorial content item to determine tokens (e.g., words or combinations of characters) and their corresponding parts of speech such as nouns, verbs, adjectives, adverbs, etc. The knowledge graph recommendation system 102 utilizes the natural language model to determine prominent action verbs and objects related to the prominent action verbs in the phrases or sentences. Accordingly, the knowledge graph recommendation system 102 determines a task based on prominent action verbs and/or the related objects.

Furthermore, a single tutorial content item or portion of a tutorial content item can include a plurality of different tasks. As an example, in the phrase "How to remove skin blemishes and objects from an image," the knowledge graph recommendation system 102 extracts "remove skin blemishes" and "remove objects" based on the extracted dependency tree. Accordingly, the knowledge graph recommendation system 102 determines that the phrase includes two separate tasks.

In addition to extracting tasks from tutorial content items, FIG. 2B illustrates that the ingestion pipeline 202 includes an operation for task matter extraction 218 to extract task matters from the tutorial content items. In one or more embodiments, the knowledge graph recommendation system 102 utilizes the natural language processing model (e.g., a separate instance of the natural language processing model used to extract tasks) to extract a list of keywords or significant terms from a tutorial content item related to the extracted tasks. To illustrate, the knowledge graph recommendation system 102 extracts words or phrases indicating subject categories of the extracted tasks. In some embodiments, the knowledge graph recommendation system 102 extracts the top N important unigrams and bigrams to determine the task matters from the tutorial content items. As an example, the knowledge graph recommendation system 102 extracts a task "make a movie poster" utilizing the operation for task extraction 216 and then utilizes the operation for task matter extraction 218 to extract a task matter of "movie," as the main subject matter of the extracted task is the concept "movie." For example, the knowledge graph recommendation system 102 can utilize the spaCy library or another model to extract entities from the document title and text.

In one or more further embodiments, as illustrated in FIG. 2B, the knowledge graph recommendation system 102 utilizes the natural language processing model or a keyword matching model to perform an operation for defect keyword extraction 220 to extract defect keywords phrases from the tutorial content items. In particular, a defect keyword/phrase corresponds to a one or more tools of a particular subset of tools in a digital content editing application. For instance, the knowledge graph recommendation system 102 extracts defect keywords including, but are not limited to, actions such as "contrast," "brightness," "shadow," "sharpen," "blur," using regular expressions and signals such as "adjust," "slider," or "intensity." In some embodiments, the knowledge graph recommendation system 102 extracts different defect keywords in connection with different digital content editing applications (e.g., if the defect keywords for a first application are different than the defect keywords for a second application).

According to one or more embodiments, the knowledge graph recommendation system 102 utilizes an operation for tools extraction 222 to extract words or phrases indicating one or more tools from the tutorial content items. Specifically, the knowledge graph recommendation system 102 utilizes a name entity recognition model to extract specific tool names associated with one or more digital content editing applications from the tutorial content items. For example, the name entity recognition model involves utilizing character embeddings, word embeddings, and/or long short-term memory model to determine tool names of the one or more digital content editing applications from the tutorial content items. The knowledge graph recommendation system 102 can train the named entity recognition model utilizing tutorials and ground truth tools. Specifically, the named entity recognition model can utilize embeddings and LSTM layers to predict a tool. The knowledge graph recommendation system 102 can compare the predicted tool with a ground truth tool and modify parameters of the name entity recognition model to more accurately predict tools in future iterations.

Table 1 below illustrates results from an evaluation of a named entity recognition model utilized by the knowledge graph recommendation system 102 at different confidence thresholds. In particular, precision indicates the percentage of true positives relative to actual results, recall indicates the percentage of true positives relative to the predicted results, and F1 score indicates the balance between the precision and recall.

| Confidence | 0.85 | 0.90 | 0.92 | 0.93 | 0.94 |
|---|---|---|---|---|---|
| Precision | 0.730 | 0.733 | 0.736 | 0.749 | 0.911 |
| Recall | 0.806 | 0.806 | 0.806 | 0.799 | 0.352 |
| F1 Score | 0.766 | 0.767 | 01769 | 0.773 | 0.508 |

In some embodiments, a single tutorial content item can include references to one or more tools from one or more digital content editing applications. To illustrate, the knowledge graph recommendation system 102 determines that a tutorial content item includes one or more name entities of one or more tools for a first digital content editing application such as a "brush" tool or a "fill" tool. In another example, the knowledge graph recommendation system 102 determines that a tutorial content item includes one or more name entities of one or more tools for the first digital content editing application and a second digital content editing application.

As illustrated in FIG. 2B, in one or more additional embodiments, the knowledge graph recommendation system 102 utilizes an operation for commands extraction 224 in the ingestion pipeline 202 to extract commands from the tutorial content items. In particular, the knowledge graph recommendation system 102 utilizes a named entity recognition model or a fuzzy matching model to extract commands from the tutorial content items. For example, the knowledge graph recommendation system 102 extracts commands related to performing a task such as commands corresponding to tools, menu items, or panels within a digital content editing application. In one or more embodiments, the knowledge graph recommendation system 102 also extracts commands for a plurality of digital content editing applications having different command structures.

Furthermore, as illustrated in FIG. 2B, the knowledge graph recommendation system 102 utilizes an operation for determining regular expression annotators 226 from the tutorial content items. In one or more embodiments, the knowledge graph recommendation system 102 utilizes a natural language model or regular expressions to extract additional context signals related to tasks identified in the tutorial content items. For instance, the knowledge graph recommendation system 102 determines context signals from the tutorial content items including, but not limited to, indications of user/skill levels associated with tasks, document types (e.g., whether a particular task corresponds to an image, text document, video file, or audio file), task taxonomy labels (e.g., a class or category to which a particular task belongs), tags (e.g., object or visual element tags) or other key terms associated with tasks.

After utilizing the ingestion pipeline 202 to extract a plurality of terms and concepts from the tutorial content items, the knowledge graph recommendation system 102 utilizes the extracted information to generate the digital knowledge graph 204. For example, as illustrated in FIG. 2B, the knowledge graph recommendation system 102 generates the digital knowledge graph 204 from the extracted tasks, task matters, defect keywords, tools, commands, and other context signals. To illustrate, the knowledge graph recommendation system 102 generates nodes representing the extracted concepts.

Additionally, the knowledge graph recommendation system 102 determines relationships between the extracted concepts based on the extracted information and the correspondences associated with the tutorial content items. In particular, the knowledge graph recommendation system 102 determines that a particular task is associated with a set of context signals including task matter, document type, etc. The knowledge graph recommendation system then generates edges between the nodes in the digital knowledge graph 204 according to the determined relationships. In addition, in some embodiments, the knowledge graph recommendation system 102 also establishes edge weights based on the determined relationships to indicate stronger or weaker relationships based on the number of times that a task is associated with a particular context signal in the plurality of tutorial content items (or other relationship strength indicators). In some embodiments, the knowledge graph recommendation system 102 leverages external knowledge bases to add common knowledge (e.g., based on known entities and relationships) to the graph.

In an example embodiment of the ingestion pipeline 202 of the knowledge graph recommendation system 102, the knowledge graph recommendation system 102 extracts a plurality of tasks and other data from a plurality of tutorial content items utilizing the ingestion pipeline 202. To illustrate, the knowledge graph recommendation system 102 extracts data from a tutorial content item "How to composite multiple images to create a collage." Specifically, the knowledge graph recommendation system 102 extracts a task "create collage," a task matter "collage," an asset type "photo," tools "['polygon', 'lasso', 'polygonal lasso', 'eraser', 'rectangular marquee']", and panels "['color']." The knowledge graph recommendation system 102 then generates nodes corresponding to each of the extracted data points and then connects the nodes based on the relationships indicated in the tutorial content item.

Figure 3A:
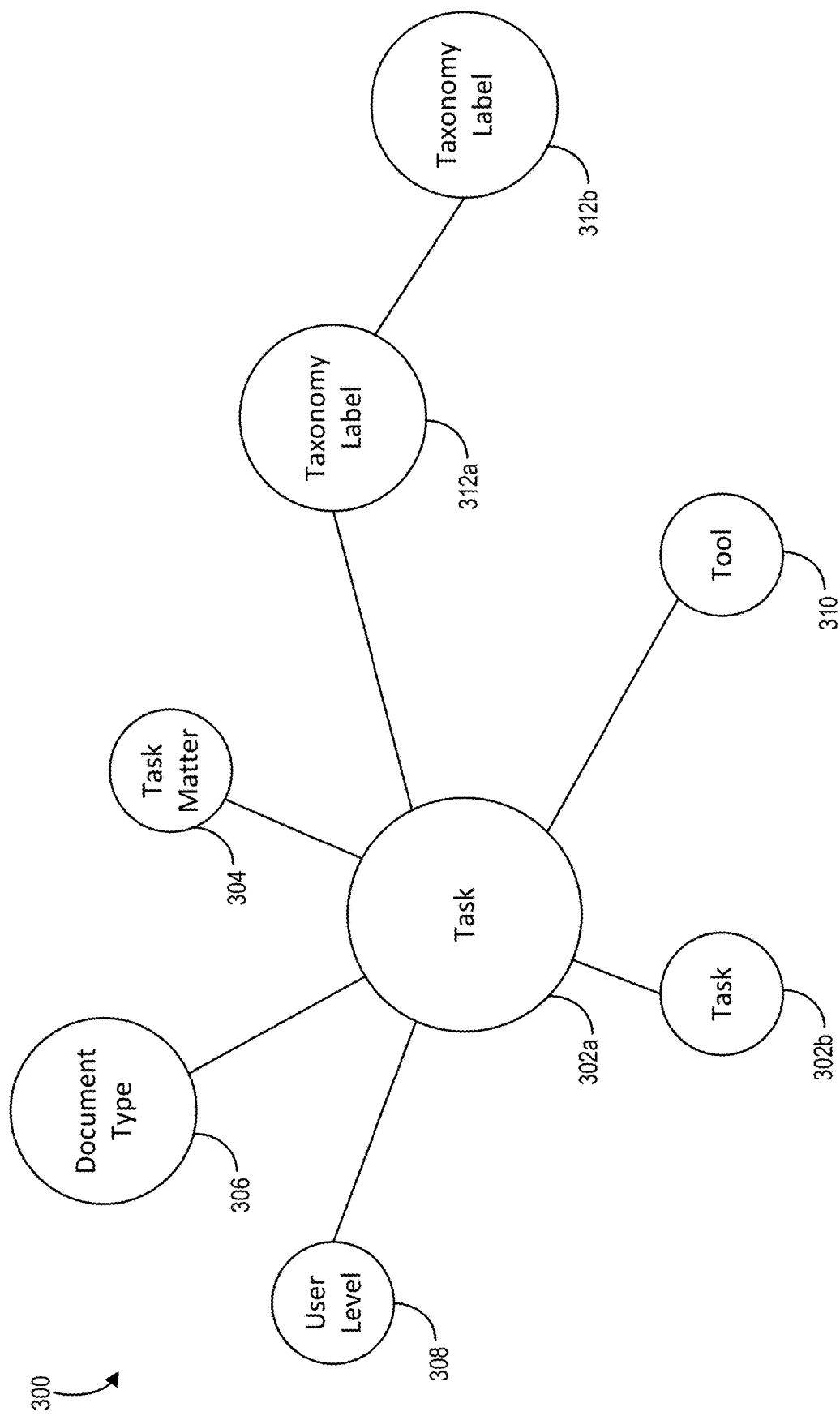
FIGS. 3A-3B illustrate diagrams of a digital knowledge graph and a subgraph generated based on digital resource items in accordance with one or more implementations.
Figure 3B:
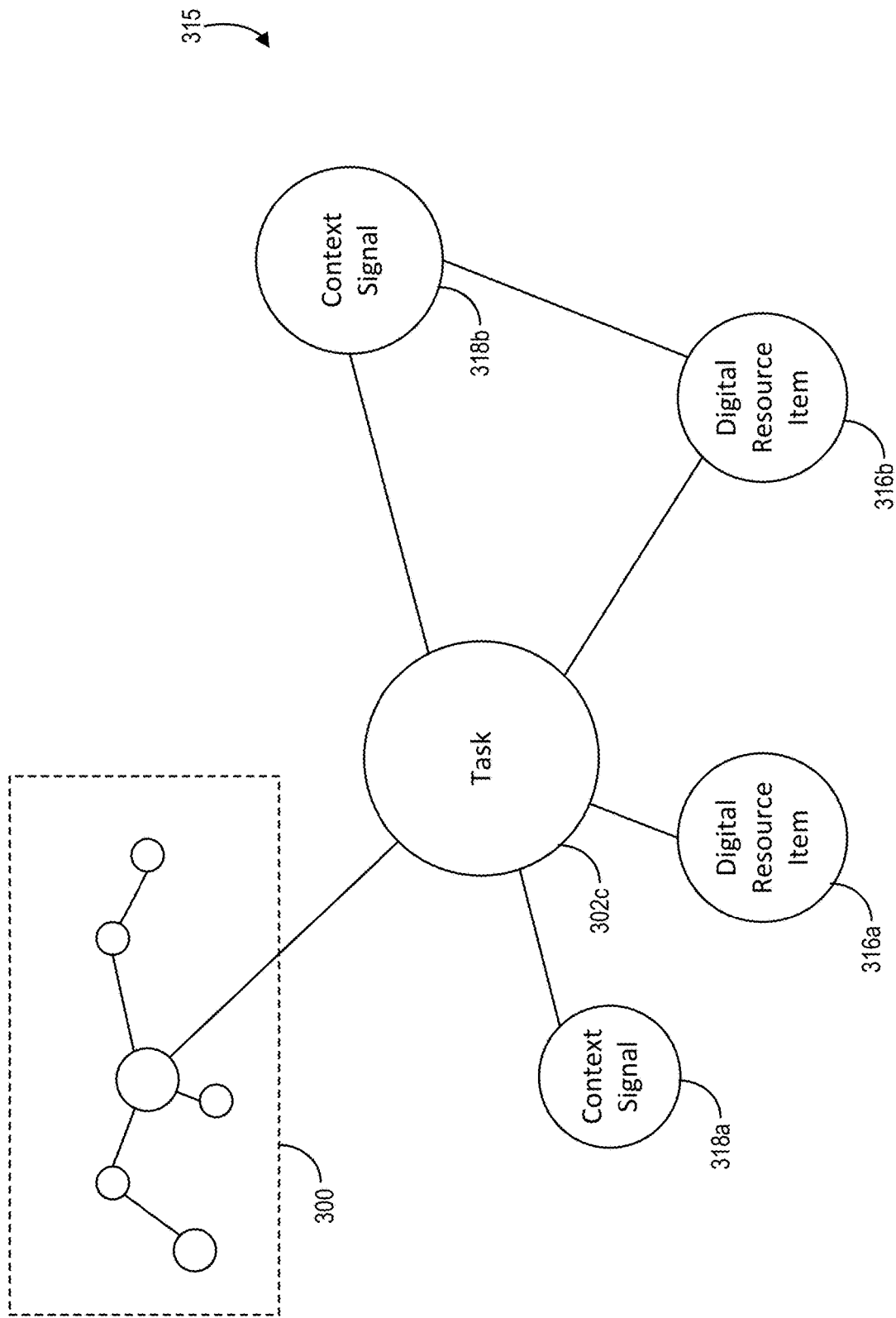

FIGS. 3A-3B illustrate embodiments of digital knowledge graphs corresponding to information extracted from one or more tutorial content items. In particular, FIG. 3A illustrates a digital knowledge graph 300 including nodes and edges based on a plurality of concepts related to a plurality of tasks in one or more tutorial content items. Additionally, FIG. 3B illustrates a subgraph 315 associated with the digital knowledge graph 300 including additional nodes and edges based on digital resource items and a particular task.

As mentioned, FIG. 3A illustrates the digital knowledge graph 300 generated based on a plurality of tutorial content items. In one or more embodiments, the knowledge graph recommendation system 102 generates the digital knowledge graph 300 by generating a plurality of nodes corresponding to concepts extracted from the tutorial content items. For instance, the knowledge graph recommendation system 102 generates task nodes, task matter nodes, document type nodes, user/skill level nodes, tool nodes, and/or taxonomy label nodes corresponding to information extracted from the tutorial content items. In additional embodiments, the knowledge graph recommendation system 102 generates additional nodes for other context signals.

FIG. 3A illustrates that the knowledge graph recommendation system 102 generates a first task node 302a based on a first task extracted from the tutorial content items and a second task node 302b based on a second task extracted from the tutorial content items. For example, as previously mentioned, the knowledge graph recommendation system 102 extracts the first task from one or more portions of one or more tutorial content items. Additionally, the knowledge graph recommendation system 102 extracts the second task from one or more portions of one or more tutorial content items. In some embodiments, the portion(s) indicating the first task and the portion(s) indicating the second task are the same portion(s) and/or in the same tutorial content items. Alternatively, the portion(s) indicating the first task and the portion(s) indicating the second task are different portion(s) and/or in different tutorial content items.

Additionally, the knowledge graph recommendation system 102 generates a task matter node 304 corresponding to one or more task matters associated with the first extracted task. For example, as previously mentioned, the knowledge graph recommendation system 102 determines a subject category corresponding to the first extracted task. The knowledge graph recommendation system 102 also connects the task matter node 304 to the task node 302a based on the association between the task matter and the first task.

Furthermore, the knowledge graph recommendation system 102 generates a document type node 306 corresponding to a document types extracted from the tutorial content items. In particular, the knowledge graph recommendation system 102 determines that the tasks identified in the tutorial content items correspond to specific document types (e.g., the tasks are performed within the specific document types). Specifically, a first digital content editing application performs the first task within a document of a particular document type (e.g., an image). The knowledge graph recommendation system 102 thus extracts the document type associated with the first task and generates the document type node 306 representing the extracted document type. Additionally, the knowledge graph recommendation system 102 connects the document type node 306 to the task node 302a based on the determined relationship between the first task and the document type.

FIG. 3A also illustrates that the knowledge graph recommendation system 102 generates a user level node 308 corresponding to an extracted user/skill level related to performing the first extracted task and connects the user level node 308 to the task node 302a. For instance, the knowledge graph recommendation system 102 determines the user skill level associated with performing a particular task (e.g., the first task). More specifically, the knowledge graph recommendation system 102 determines that a particular task corresponds to a beginner user skill level, intermediate user skill level, or advanced user skill level. In some embodiments, the knowledge graph recommendation system 102 determines the user skill level based on text in the tutorial content items and/or tags corresponding to the tutorial content items. In additional embodiments, the knowledge graph recommendation system 102 determines the user skill level based on previously determined data associated with a task.

In addition, the knowledge graph recommendation system 102 determines tools associated with tasks from the tutorial content items. For example, as illustrated in FIG. 2B, the knowledge graph recommendation system 102 generates a tool node 310 representing the identified tools. To illustrate, the knowledge graph recommendation system 102 determines that a digital content editing application performs the first task utilizing a specific tool (e.g., smoothing skin utilizing a brush tool). The knowledge graph recommendation system 102 generates the tool node 310 representing the identified tool and then connects the tool node 310 to the first task node 302a.

Furthermore, in one or more embodiments, the knowledge graph recommendation system 102 extracts taxonomy labels from the plurality of tutorial content items. In particular, the knowledge graph recommendation system 102 determines the categories or classes of each of the tasks extracted from the tutorial content items. For instance, as illustrated in FIG. 3A, the knowledge graph recommendation system 102 generates a first taxonomy label node 312a indicating a first task taxonomy of the first task corresponding to the first task node 302a based on at least one tutorial content item. As an example, the first task taxonomy includes a task category of "Creating graphics, layouts, and effects."

Additionally, in one or more embodiments, the knowledge graph recommendation system 102 also determines layers of task taxonomies (e.g., broad categories, subcategories). Accordingly, in one or more embodiments, the knowledge graph recommendation system 102 generates a plurality of taxonomy label nodes (e.g., including a second taxonomy label node 312b). For instance, in connection with the first task category, the knowledge graph recommendation system 102 determines a second task category of "Creating marketing material" based on the tutorial content item(s). The knowledge graph recommendation system 102 connects the second taxonomy label node 312b to the first taxonomy label node 312a based on the determined relationship.

Although not illustrated in FIG. 3A, in one or more additional embodiments, the knowledge graph recommendation system 102 determines additional information associated with a plurality of tasks from tutorial content items. For instance, as previously mentioned, the knowledge graph recommendation system 102 determines defect keywords, tags (e.g., objects), commands, or other context signals that indicate characteristics of the environments in which the plurality of tasks are performed. The knowledge graph recommendation system 102 generates nodes for each of the additional context signals and connects the corresponding nodes to the corresponding tasks.

In one or more embodiments, the knowledge graph recommendation system 102 also generates one or more subgraphs associated with the digital knowledge graph 300. For example, as illustrated in FIG. 3B, the knowledge graph recommendation system 102 generates the subgraph 315 associated with the digital knowledge graph 300 in connection with one or more types of digital resource items and/or one or more subsets of digital content editing applications. Specifically, the knowledge graph recommendation system 102 generates the subgraph 315 to capture relationships between a particular task or tasks and one or more digital resource items. By utilizing the subgraph 315, the knowledge graph recommendation system 102 can further improve efficiency of implementing systems. Indeed, by utilizing two graphs (a main knowledge graph and a subgraph), the knowledge graph recommendation system 102 can more efficiently scale to accommodate millions of digital resource items.

In one or more embodiments, the knowledge graph recommendation system 102 generates the subgraph 315 in connection with a third task represented by a third task node 302c from the digital knowledge graph 300. Additionally, as illustrated in FIG. 3B, the knowledge graph recommendation system 102 determines one or more digital resource items associated with the third task. To illustrate, the knowledge graph recommendation system 102 determines that a particular task includes generating stylized text. Accordingly, the knowledge graph recommendation system 102 determines a plurality of different digital fonts associated with a digital content editing application for performing the task.

The knowledge graph recommendation system 102 then generates nodes representing the digital resource items related to the corresponding task. For instance, the knowledge graph recommendation system 102 generates a plurality of digital resource item nodes (e.g., a first digital resource item node 316a and a second digital resource item node 316b) and connects the digital resource item nodes to the third task node 302c. To illustrate, the knowledge graph recommendation system 102 generates nodes representing different fonts in connection with a task for generating stylized text. In addition, one or more of the digital resource items includes one or more tutorial content items associated with the task (e.g., a tutorial content item that describes one or more operations for performing the task).

In additional embodiments, the knowledge graph recommendation system 102 determines context signals associated with performing a particular task and in connection with digital resource items. Specifically, the knowledge graph recommendation system 102 determines that a particular task is associated with a digital resource item based on contextual information. For example, the knowledge graph recommendation system 102 determines that digital resource items are associated with a task based on context signals such as dates, themes, object tags, or other indicators of specific digital resource items.

To illustrate, the knowledge graph recommendation system 102 determines that digital content in a digital content editing application at a client device is generated during a range of dates associated with a specific holiday or includes digital content indicating the specific holiday. The knowledge graph recommendation system 102 then generates context signal nodes (e.g., a first context signal node 318a and a second context index node 318b). Additionally, the knowledge graph recommendation system 102 also connects the generated context signal nodes to the corresponding task node and/or digital resource item node to indicate the relationship between the task, context signals, and/or digital resource items.

Figure 4A:
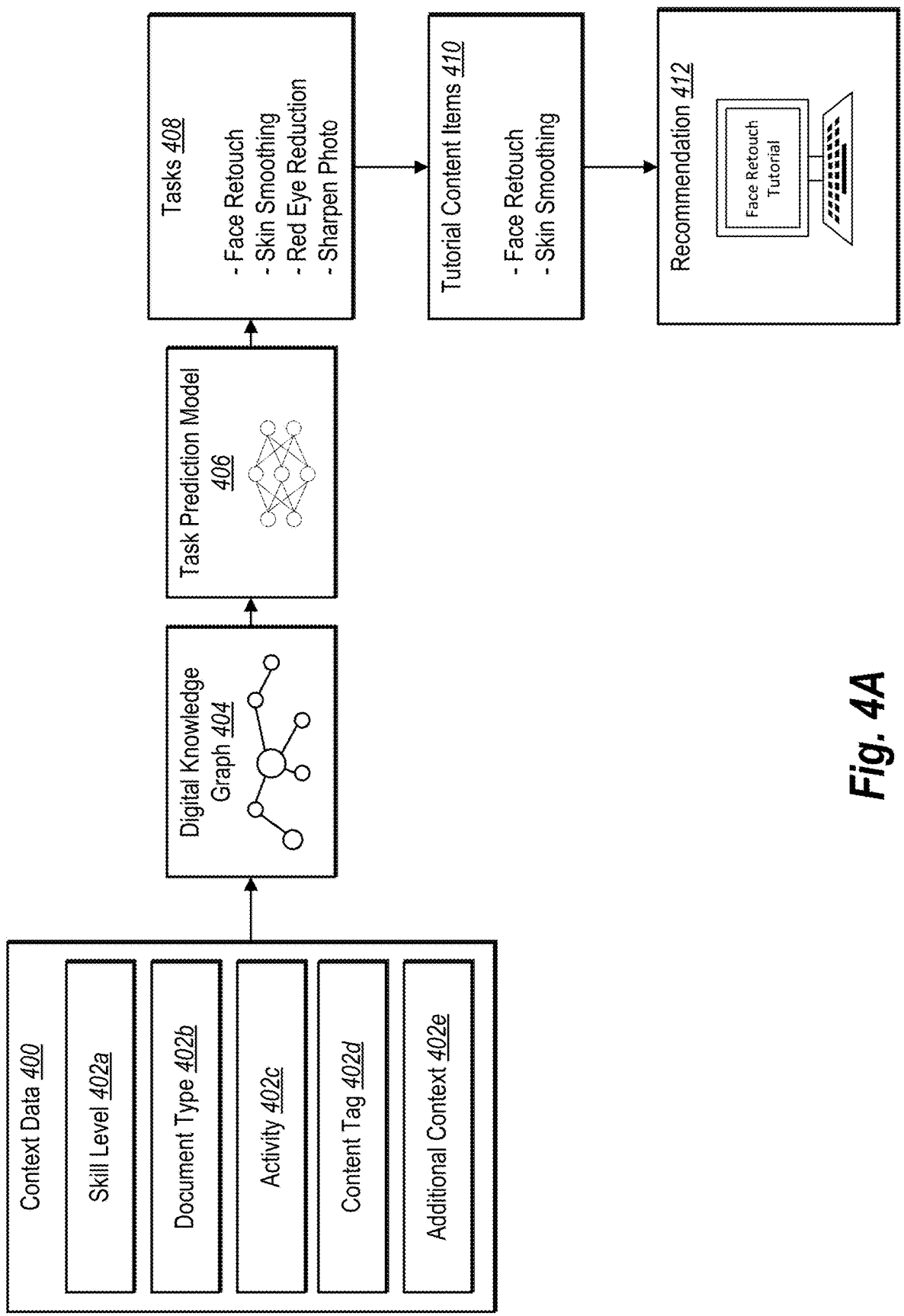
FIGS. 4A-4B illustrate the knowledge graph recommendation system generating recommendations from context signals in accordance with one or more implementations.
Figure 4B:
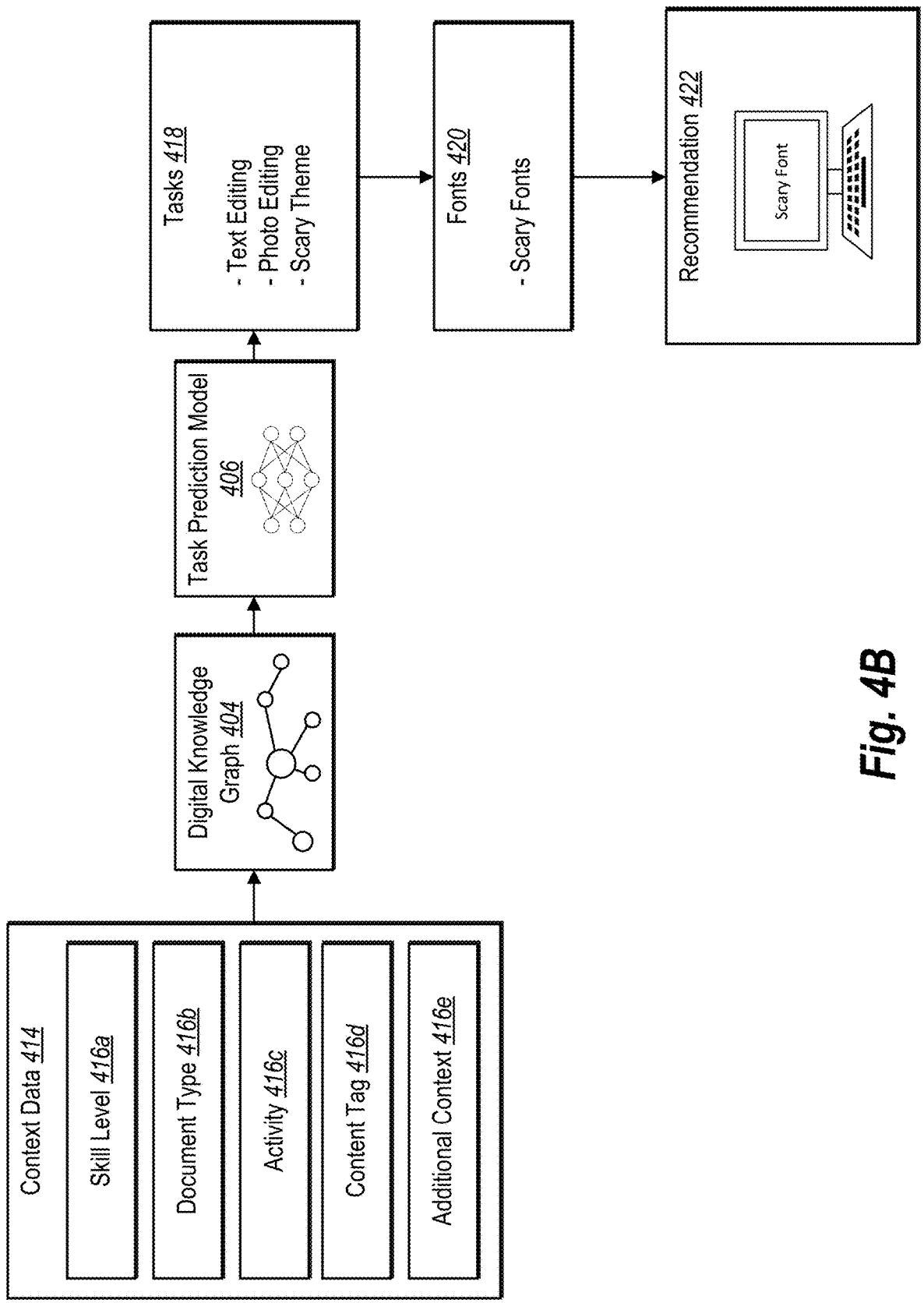

After generating a digital knowledge graph and any subgraphs associated with the digital knowledge graph, the knowledge graph recommendation system 102 utilizes the digital knowledge graph (and subgraphs) to generate recommendations. For example, FIGS. 4A-4B illustrate embodiments of processes for generating recommendations of digital resource items. Specifically, FIG. 4A illustrates a process for generating a recommendation of a tutorial content item using digital knowledge graph. FIG. 4B illustrates a process for generating a recommendation of a non-tutorial digital resource item (i.e., a font, color, theme, or template).

As illustrated in FIG. 4A, the knowledge graph recommendation system 102 utilizes context data 400 in connection with a digital content editing application at a client device. Specifically, the knowledge graph recommendation system 102 receives the context signals from the client device while a user interacts with the digital content editing application to generate or edit digital content. For example, as illustrated, the context data 400 include a skill level 402a, a document type 402b, an activity 402c, a content tag 402d, and additional context 402e.

In one or more embodiments, the knowledge graph recommendation system 102 determines the skill level 402a, the document type 402b, the activity 402c, the content tag 402d, and/or the additional context 402e from the digital content editing application at the client device. For example, the knowledge graph recommendation system 102 determines one or more of the context signals based on a task history associated with the digital content editing application (e.g., based on an "undo history" from the application). Additionally, in one or more embodiments, the knowledge graph recommendation system 102 determines one or more of the context signals by tracking a position of a cursor or other input within a digital content editing application.

According to one example, the skill level 402a indicates that the user of the client device has a particular skill level (e.g., beginner, intermediate, advanced). In one or more embodiments, the knowledge graph recommendation system 102 determines the skill level 402a based on a user profile associated with the client device. In additional embodiments, the knowledge graph recommendation system 102 determines the skill level 402a based on a skill level model that predicts the skill level of the user based on previous interactions by the user with the digital content editing application (or other digital content editing applications).

Additionally, in one embodiment, the document type 402b indicates type of document open (e.g., "photograph") within a digital content editing application. Furthermore, the activity 402c indicates an activity performed by the user or a command performed by the user (e.g., "open") within the digital content editing application. The content tag 402d indicates contextual information about the content of the document open (e.g., "wedding") within the digital content editing application based on visual data detected within the document. The additional context 402e indicates additional context data such as whether a face is present in the document or an experience state (e.g., "discover") of the digital content editing application. In some embodiments, the knowledge graph recommendation system 102 utilizes determines a face signal for context data based on a percentage of an image area occupied by the face area.

In one or more embodiments, the knowledge graph recommendation system 102 then utilizes a digital knowledge graph 404 to make one or more recommendations in connection with the context data 400. In particular, the knowledge graph recommendation system 102 utilizes a task prediction model 406 to generate one or more predicted tasks 408. For example, the knowledge graph recommendation system 102 utilizes an embedding-based model to generate embeddings for link predictions based on the digital knowledge graph 404. To illustrate, the knowledge graph recommendation system 102 computes a similarity or affinity score of context signal nodes and target tasks nodes or other concept nodes extracted from tutorial content items for various digital content editing applications.

For example, the knowledge graph recommendation system 102 can utilize graph embedding approaches such as ComplEx or Attri2vec to determine embeddings for link predictions. In particular, the knowledge graph recommendation system 102 can utilize AmpliGraph and/or StellarGraph learning libraries. The knowledge graph recommendation system 102 can then compute similarity or affinity scores of any user context node and a target creative concept.

According to one or more embodiments, the knowledge graph recommendation system 102 uses context data received from a client device to make real-time predictions of user intent indicating a task. For instance, the knowledge graph recommendation system 102 trains the task prediction model 406 to learn representations of the entities (e.g., nodes) in the digital knowledge graph 404 to associate the user's context with the intent. Specifically, the knowledge graph recommendation system 102 utilizes a classification model to assign context signals from the client device to one or more tasks. Accordingly, the task prediction model 406 also learns the relationships between nodes in the digital knowledge graph 404. For example, the knowledge graph recommendation system 102 can leverage the FastText library for efficient learning of word representations and sentence classifications. For instance, the knowledge graph recommendation system 102 can train a supervised classification model that assigns incoming user contexts to creative tasks.

In some embodiments, when training the task prediction model 406, the knowledge graph recommendation system 102 generates seed training data for training the task prediction model 406 from the tutorial content items via the ingestion pipeline with the named entity recognition models and natural language models. The knowledge graph recommendation system 102 assigns the extracted attributes from the tutorial content items to tasks. In some embodiments, the knowledge graph recommendation system 102 augments the training data with additional rows to account for additional combinations, permutations, and sparsity in the received context data.

Once the task prediction model 406 is trained, the knowledge graph recommendation system 102 utilizes the trained task prediction model 406 to generate task predictions based on the context data 400. Specifically, the knowledge graph recommendation system 102 generates embeddings for the context data 400 and then uses the task prediction model 406 to generate one or more predicted tasks based on the generated embeddings. To illustrate, the knowledge graph recommendation system 102 learns the most likely tasks that correspond to particular combinations of context data from a client device. As illustrated in FIG. 4A, for example, the knowledge graph recommendation system 102 determines tasks 408 based on the context data 400.

In one or more embodiments, the knowledge graph recommendation system 102 then determines digital resource items based on the tasks 408. For instance, the knowledge graph recommendation system 102 determines tutorial content items 410 that correspond to one or more of the tasks 408. In some embodiments, the knowledge graph recommendation system 102 determines the tutorial content items 410 by identifying the top N tutorial content items associated with each predicted task. In additional embodiments, the knowledge graph recommendation system 102 utilizes a subgraph associated with the digital knowledge graph 404 to determine the tutorial content items 410 in relation to each predicted task. The knowledge graph recommendation system 102 then generates a recommendation 412 comprising one or more of the tutorial content items 410 to provide for display at the client device (e.g., within a digital content editing application).

In one or more embodiments, the knowledge graph recommendation system 102 updates the recommendation 412 in response to each new interaction with the digital content editing application. For example, in response to receiving a new input to perform one or more commands within the digital content editing application, the knowledge graph recommendation system 102 obtains new context signals and updates a list of predicted tasks using the task prediction model 406. The knowledge graph recommendation system 102 also determines updated tutorial content items based on the updated list of predicted tasks and then provides the updated recommendation within the digital content editing application.

In addition to providing recommendations of tutorial content items to a client device, the knowledge graph recommendation system 102 also provides recommendations of other types of digital resource items. In particular, as illustrated in FIG. 4B, the knowledge graph recommendation system 102 provides a recommendation of a particular digital asset to use in connection with generating or modifying digital content in a digital content editing application. For example, the knowledge graph recommendation system 102 receives context data 414 including a skill level 416a, a document type 416b, an activity 416c, a content tag 416d, and additional context 416e.

The knowledge graph recommendation system 102 then utilizes the task prediction model 406 with the digital knowledge graph 404 to generate tasks 418 for the context data 414. To illustrate, the knowledge graph recommendation system 102 generates predicted tasks based on context data indicating that a user is performing text editing in connection with image editing. Additionally, the knowledge graph recommendation system 102 determines that the context data 414 indicates that the user intends to generate content with a scary theme. The knowledge graph recommendation system 102 then determines fonts 420 (e.g., "scare fonts") to use that correspond to the tasks 418. Additionally, the knowledge graph recommendation system 102 provides a recommendation 422 based on the fonts 420.

Although FIG. 4B illustrates a recommendation for a particular digital resource item (e.g., a font), the knowledge graph recommendation system 102 can provide recommendations for a variety of digital resource items. To illustrate, the knowledge graph recommendation system 102 generates recommendations of images, videos, colors, audio clips, templates, backgrounds, or other digital resource items related to a canvas/medium and context associated with a digital content editing application. In addition, in some embodiments, the knowledge graph recommendation system 102 provides additional recommendations such as placement of digital resource items within a document being edited.

According to one or more embodiments, the knowledge graph recommendation system 102 generated a digital knowledge graph and utilized the digital knowledge graph to predict tasks based on context data. In particular, Table 2 below includes samples of annotated data for classifications of specific classes based on a set of context data.

| Document type | Face | Tools | Objects | Task category |
| --- | --- | --- | --- | --- |
| Photo | FALSE | quickSelectTool | Drink, drink | Select object |
| Photo | TRUE | None | Hair | Face editing, Skin smoothing |
| Poster | FALSE | None | None | Create poster |

Figure 5A:
FIGS. 5A-5C illustrate graphical user interfaces of a digital content editing application for providing recommendations utilizing a digital knowledge graph in accordance with one or more implementations.
Figure 5B:
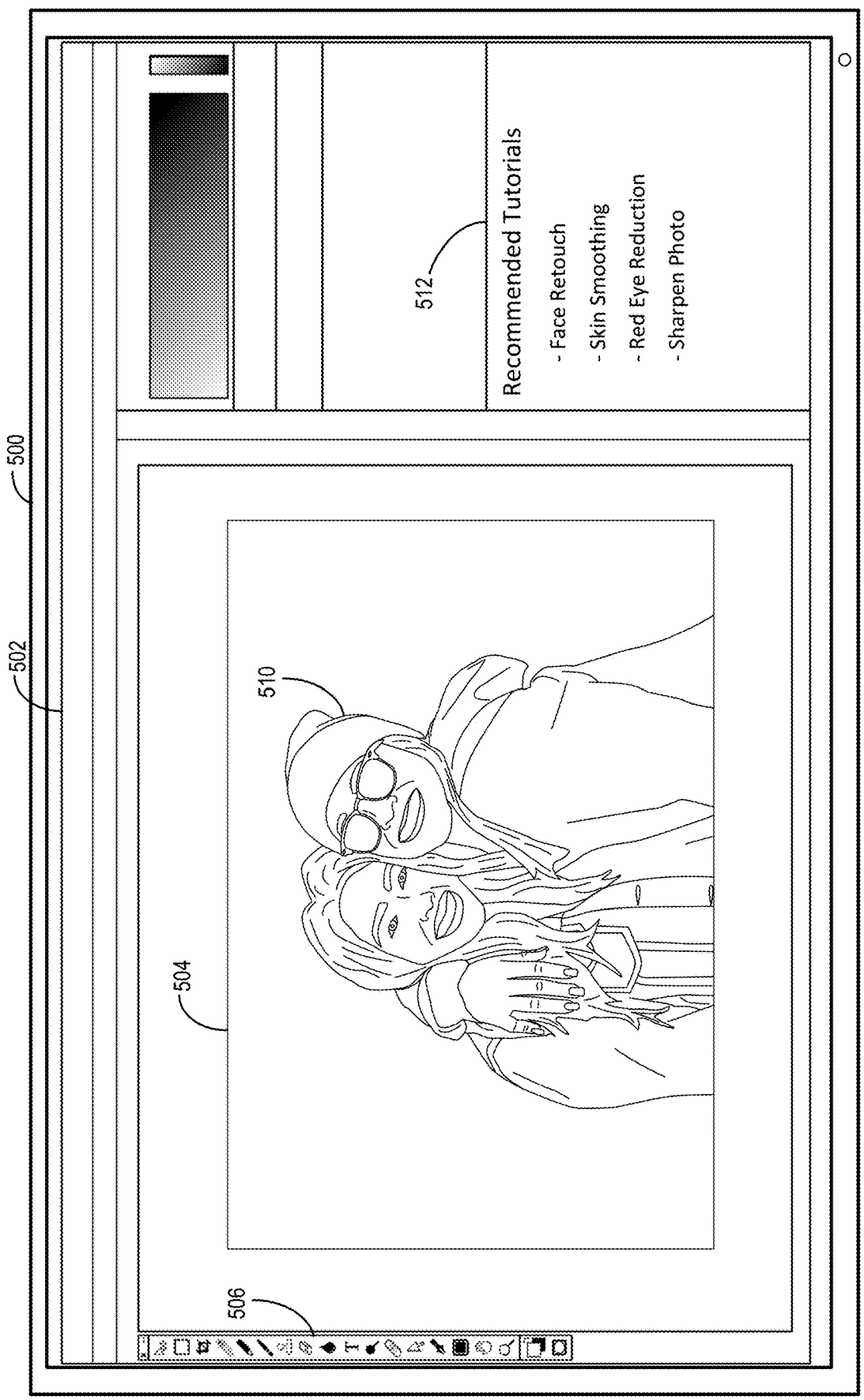
Figure 5C:
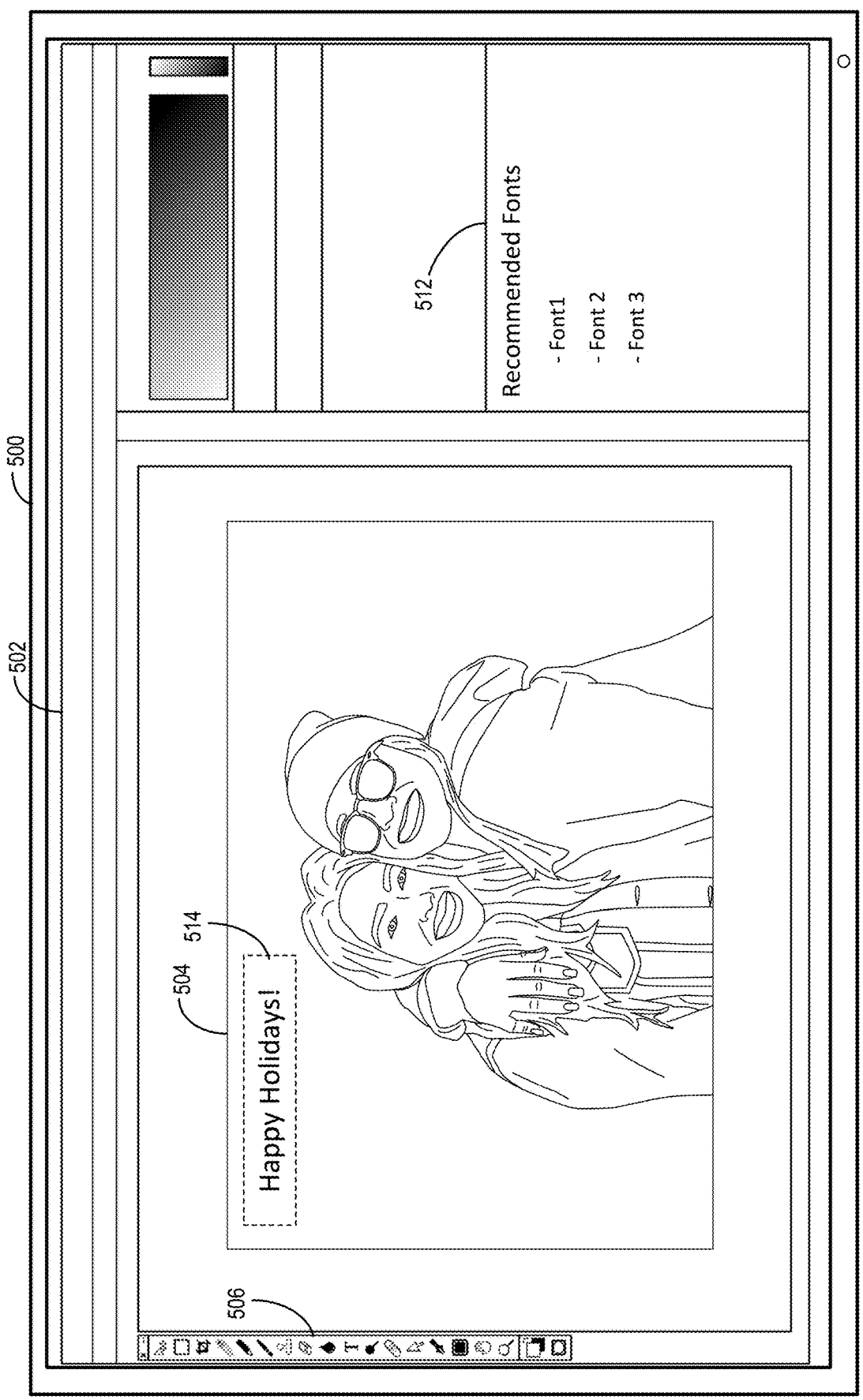

FIGS. 5A-5C illustrate graphical user interfaces of a client device 500 including a digital content editing application 502. Specifically, as illustrated in FIG. 5A, the digital content editing application 502 can be a digital image editing application in which a user interacts with the client device 500 to generate or edit a digital image 504 using a plurality of image editing tools 506. For example, the client device 500 detects user inputs via the graphical user interfaces to modify the digital image 504 by adding, removing, or changing content within the digital image 504 based on a selected tool and properties of the selected tool. In additional embodiments, the client device 500 modifies content of the digital image 504 based on interactions with, or properties of, one or more panels 508 comprising additional tools, commands, or settings for interacting with the digital image 504 (e.g., a layers panel).

In one or more embodiments, the knowledge graph recommendation system 102 determines context data from the client device 500 based on user interactions within the digital content editing application 502. For instance, the knowledge graph recommendation system 102 tracks tools, panels, menu items, or commands utilized by a user within the digital content editing application 502. The knowledge graph recommendation system 102 then utilizes the tracked interactions, along with the digital image 504 and other contextual information such as the document type and content within the digital image 504, to determine context data.

Based on the determined context data, the knowledge graph recommendation system 102 generates recommendations of digital resource items to provide for display at the client device 500. For example, FIG. 5B illustrates that the knowledge graph recommendation system 102 determines context data including a document type of a photograph including a face 510 and one or more tools with which the user interacted. The knowledge graph recommendation system 102 then generates a predicted task and determines tutorial content items related to the predicted task to provide for display at the client device 500. In one or more embodiments, the knowledge graph recommendation system 102 provides the recommended tutorial content items within a recommendation panel 512, as illustrated in FIG. 5B.

FIG. 5C illustrates that the knowledge graph recommendation system 102 provides recommendations of digital resource items in addition to tutorial content items. To illustrate, the knowledge graph recommendation system 102 determines that the user inserts digital text 514 into the digital image 504. The knowledge graph recommendation system 102 processes the digital text 514 (e.g., using natural language processing) to determine that the text relates to a particular topic or concept. The knowledge graph recommendation system 102 also determines context data related to the digital text 514 such as a current date. In response to determining the context data, the knowledge graph recommendation system 102 determines one or more digital resource items (e.g., fonts) based on the context data and provides a recommendation with the one or more digital resource items within the recommendation panel 512.

Figure 6:
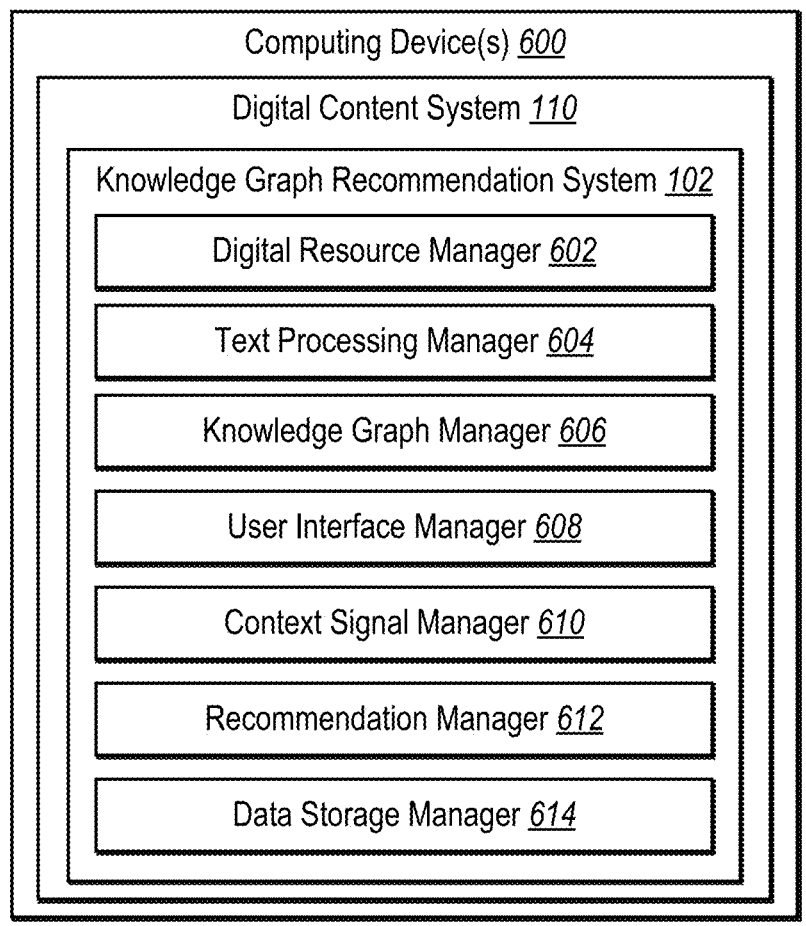
FIG. 6 illustrates a diagram of the knowledge graph recommendation system of FIG. 1 in accordance with one or more implementations.

FIG. 6 illustrates a detailed schematic diagram of an embodiment of the knowledge graph recommendation system 102 described above. As shown, the knowledge graph recommendation system 102 is implemented in a digital content system 110 on computing device(s) 600 (e.g., a client device and/or server device as described in FIG. 1, and as further described below in relation to FIG. 8). Additionally, in one or more embodiments, the knowledge graph recommendation system 102 includes, but is not limited to, a digital resource manager 602, a text processing manager 604, a knowledge graph manager 606, a user interface manager 608, a context signal manager 610, a recommendation manager 612, and a data storage manager 614. The knowledge graph recommendation system 102 can be implemented on any number of computing devices. In one or more embodiments, the knowledge graph recommendation system 102 is implemented in a distributed system of server devices for digital content generation and editing. In alternative embodiments, the knowledge graph recommendation system 102 is implemented within one or more additional systems. Alternatively, the knowledge graph recommendation system 102 may be implemented on a single computing device such as a single client device.

In one or more embodiments, each of the components of the knowledge graph recommendation system 102 is in communication with other components using any suitable communication technologies. Additionally, in some embodiments, the components of the knowledge graph recommendation system 102 are in communication with one or more other devices including other computing devices of a user, server devices (e.g., cloud storage devices), licensing servers, or other devices/systems. It will be recognized that although the components of the knowledge graph recommendation system 102 are shown to be separate in FIG. 6, any of the subcomponents may be combined into fewer components, such as into a single component, or divided into more components as may serve a particular implementation. Furthermore, although the components of FIG. 6 are described in connection with the knowledge graph recommendation system 102, in one or more embodiments, at least some of the components for performing operations in conjunction with the knowledge graph recommendation system 102 described herein are implemented on other devices within the environment.

In some embodiments, the components of the knowledge graph recommendation system 102 include software, hardware, or both. For example, the components of the knowledge graph recommendation system 102 include one or more instructions stored on a computer-readable storage medium and executable by processors of one or more computing devices (e.g., the computing device(s) 600). When executed by the one or more processors, the computer-executable instructions of the knowledge graph recommendation system 102 can cause the computing device(s) 600 to perform the operations described herein. Alternatively, the components of the knowledge graph recommendation system 102 can include hardware, such as a special purpose processing device to perform a certain function or group of functions. Additionally, or alternatively, the components of the knowledge graph recommendation system 102 can include a combination of computer-executable instructions and hardware.

Furthermore, the components of the knowledge graph recommendation system 102 performing the functions described herein with respect to the knowledge graph recommendation system 102 may, for example, be implemented as part of a stand-alone application, as a module of an application, as a plug-in for applications, as a library function or functions that may be called by other applications, and/or as a cloud-computing model. Thus, the components of the knowledge graph recommendation system 102 may be implemented as part of a stand-alone application on a personal computing device or a mobile device. Alternatively, or additionally, the components of the knowledge graph recommendation system 102 may be implemented in any application that provides digital image modification, including, but not limited to ADOBE® PHOTOSHOP®, ADOBE® AFTER EFFECTS®, ADOBE® ILLUSTRATOR®, ADOBE® PHOTOSHOP® ELEMENTS, and ADOBE® CREATIVE CLOUD® software. "ADOBE," "PHOTOSHOP," "AFTER EFFECTS," "ILLUSTRATOR," and "CREATIVE CLOUD" are either registered trademarks or trademarks of Adobe Inc. in the United States and/or other countries.

In one or more embodiments, the digital resource manager 602 provides management of a plurality of digital resource items. For example, the digital resource manager 602 manages a plurality of tutorial content items for one or more digital content editing application. In addition, the digital resource manager 602 manages a plurality of digital assets available for use via the one or more digital content editing applications. In some embodiments, the digital resource manager 602 accesses the digital resource items from a third-party system.

According to one or more embodiments, the text processing manager 604 manages the processing of digital text within tutorial content items. In one or more embodiments, the text processing manager 604 utilizes one or more models (e.g., natural language processing models, text-based classifiers, named entity recognition models) to process and interpret text in tutorial content items. Accordingly, the text processing manager 604 parses and interprets digital text in tutorial content items to determine concepts and relationships in the tutorial content items.

Additionally, the knowledge graph manager 606 generates and manages a digital knowledge graph and one or more subgraphs associated with the digital knowledge graph. For example, the knowledge graph manager 606 generates the digital knowledge graph based on concepts and relationships extracted by the text processing manager 604. The knowledge graph manager 606 also generates one or more subgraphs based on the concepts and relationships in the digital knowledge graph and a plurality of digital resource items managed by the digital resource manager 602.

In one or more embodiments, the user interface manager 608 manages graphical user interfaces of client devices to track and monitor user interactions with the client devices. To illustrate, the user interface manager 608 detects interactions with tools, panels, and menu items within a digital content editing application. Additionally, the user interface manager 608 also detects interactions with digital content of a document within the digital content editing application.

In additional embodiments, the context signal manager 610 determines context signals from client devices in connection with digital content in digital content editing applications. For instance, the context signal manager 610 communicates with the user interface manager 608 to determine interactions with content, tools, etc., within a digital content editing application. The context signal manager 610 also determines context data based on the interactions, the content, and the digital content editing application.

In one or more embodiments, the recommendation manager 612 utilizes a digital knowledge graph to determine recommendations to provide for display at client devices. Specifically, the recommendation manager 612 utilizes a task prediction model to predict tasks based on context data and the digital knowledge graph. The recommendation manager 612 further utilizes the predicted tasks to generate recommendations of digital resource items including tutorial content items and/or digital assets.

The knowledge graph recommendation system 102 also includes a data storage manager 614 (that comprises a non-transitory computer memory/one or more memory devices) that stores and maintains data associated with generating recommendations based on one or more digital knowledge graphs. For example, the data storage manager 614 stores data associated with generating a digital knowledge graph including nodes and edges of the digital knowledge graph. To illustrate, the data storage manager 614 also stores information associated with generating recommendations such as context data and digital resource items.

Figure 7:
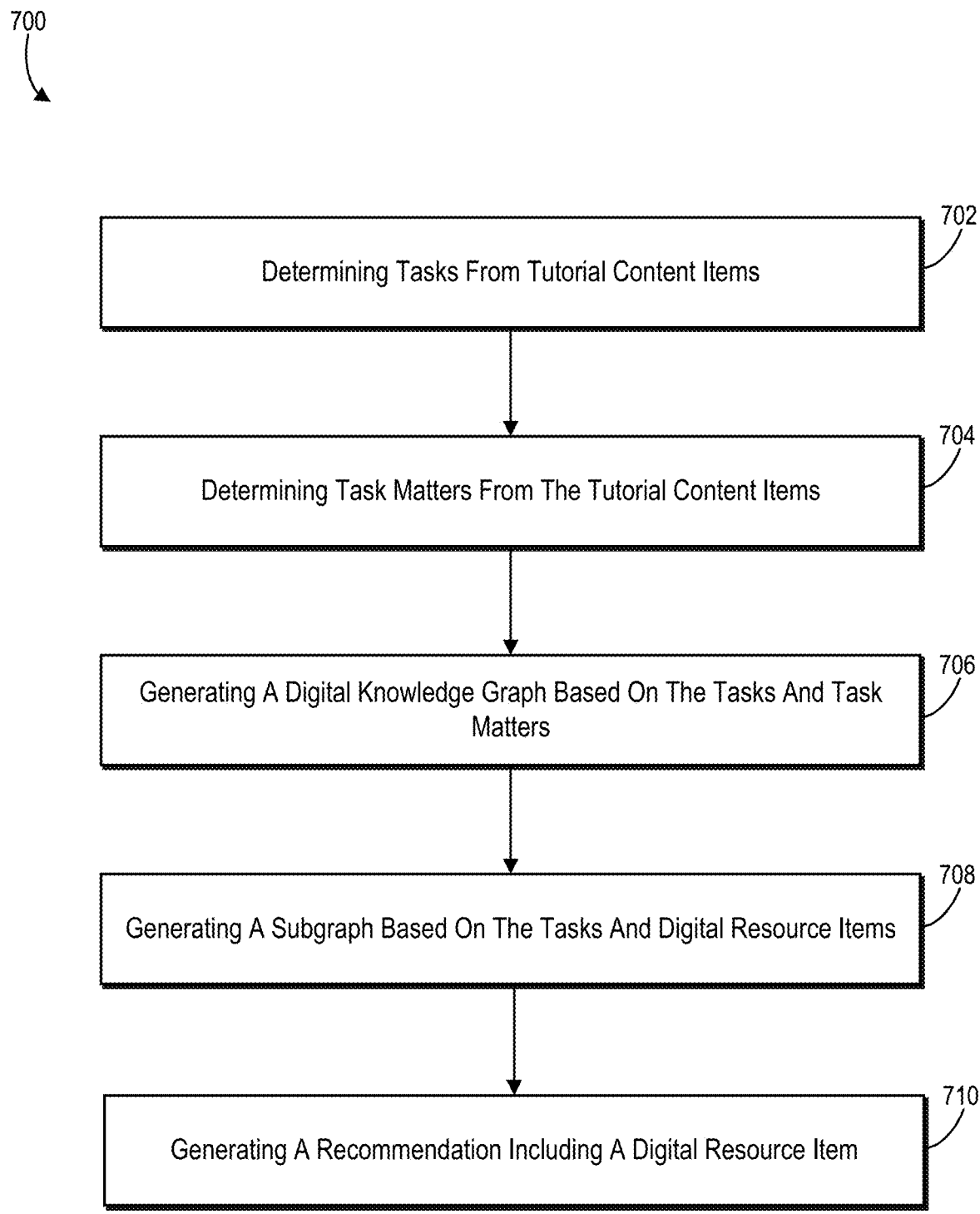
FIG. 7 illustrates a flowchart of a series of acts for generating and utilizing a digital knowledge graph to provide recommendations of digital resource items in accordance with one or more implementations.

Turning now to FIG. 7, this figure shows a flowchart of a series of acts 800 of generating and utilizing a digital knowledge graph to provide recommendations of digital resource items. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of determining tasks from tutorial content items. For example, act 702 involves determining, utilizing a natural language processing model, a plurality of tasks associated with a digital content editing application from a plurality of tutorial content items. Act 702 can involve determining, utilizing a text-based classifier on the plurality of tutorial content items, a first subset of tutorial content items corresponding to a first task category and a second subset of tutorial content items corresponding to a second task category. Act 702 can involve determining the plurality of tasks from the first subset of tutorial content items.

The series of acts 700 also includes an act 704 of determining task matters from the tutorial content items. For example, act 704 involves determining, from the plurality of tutorial content items utilizing the natural language processing model, a plurality of task matters indicating subject categories corresponding to the plurality of tasks.

The series of acts 700 can further include determining a plurality of context signals indicating characteristics of an environment in which the plurality of tasks are performed from the plurality of tutorial content items. The series of acts 700 can also include adding nodes corresponding to the plurality of context signals within the digital knowledge graph according to the plurality of tutorial content items.

Additionally, the series of acts 700 can include determining, based on the plurality of tutorial content items, a plurality of document types associated with documents in which the plurality of tasks are performed. The series of acts 700 can also include adding nodes corresponding to the plurality of document types to the digital knowledge graph according to the plurality of tutorial content items.

Furthermore, the series of acts 700 can include determining, based on the plurality of tutorial content items, a plurality of digital editing tools for performing the plurality of tasks within the digital content editing application. The series of acts can also include adding nodes corresponding to the plurality of digital editing tools to the digital knowledge graph according to the plurality of tutorial content items.

Additionally, the series of acts 700 includes an act 706 of generating a knowledge graph based on the tasks and task matters. For example, act 706 involves generating a digital knowledge graph comprising a plurality of nodes corresponding to the plurality of tasks and the plurality of task matters connected via a plurality of edges indicating relationships between the plurality of nodes. For example, act 706 involves generating the digital knowledge graph based on the first subset of tutorial content items corresponding to the first task category.

Furthermore, the series of acts 700 includes an act 708 of generating a subgraph based on the tasks and digital resource items. For example, act 708 involves generating a subgraph associated with the digital knowledge graph comprising a second set of nodes corresponding to a plurality of digital resource items and the plurality of tasks connected via a second set of edges indicating relationships between the second set of nodes.

Act 708 can involve determining a predicted task by utilizing the task prediction model on the digital knowledge graph. For example, act 708 can involve determining context data indicating characteristics of an environment of the digital content editing application for generating a digital content item at the client device. To illustrate, the context data can include context data associated with one or more user inputs to the digital content editing application at the client device. Act 708 can also involve determining the predicted task by utilizing the task prediction model on the digital knowledge graph with the context data.

The series of acts 700 also includes an act 710 of generating a recommendation including a digital resource item. For example, act 710 involves generating, utilizing the digital knowledge graph and a task prediction model, a recommendation comprising a digital resource item to provide for display at a client device. In one or more embodiments, act 710 involves generating a recommendation comprising a digital resource item to provide for display at a client device utilizing the digital knowledge graph and a subgraph associated with the digital knowledge graph.

To illustrate, act 710 can involve determining a recommended tutorial content item from the plurality of tutorial content items to provide for display at the client device. Additionally, act 710 can involve determining a recommended digital asset from a database of digital assets to insert into a digital resource item generated at the client device. For instance, act 710 can involve selecting the tutorial content item or the digital resource item to recommend from a ranked set of tutorial content items corresponding to the plurality of tasks.

Additionally, act 710 can involve generating the recommendation comprising the digital resource item based on the subgraph associated with the digital knowledge graph and the predicted task. To illustrate, act 710 can involve selecting the tutorial content item from the plurality of digital resource items utilizing the predicted task and the subgraph associated with the digital knowledge graph.

Act 710 can involve determining first feature representations based on the plurality of nodes in the digital knowledge graph. Act 710 can further involve determining second feature representations based on the context data associated with the one or more user inputs. Act 710 can also involve determining the tutorial content item based on the first feature representations and the second feature representations.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
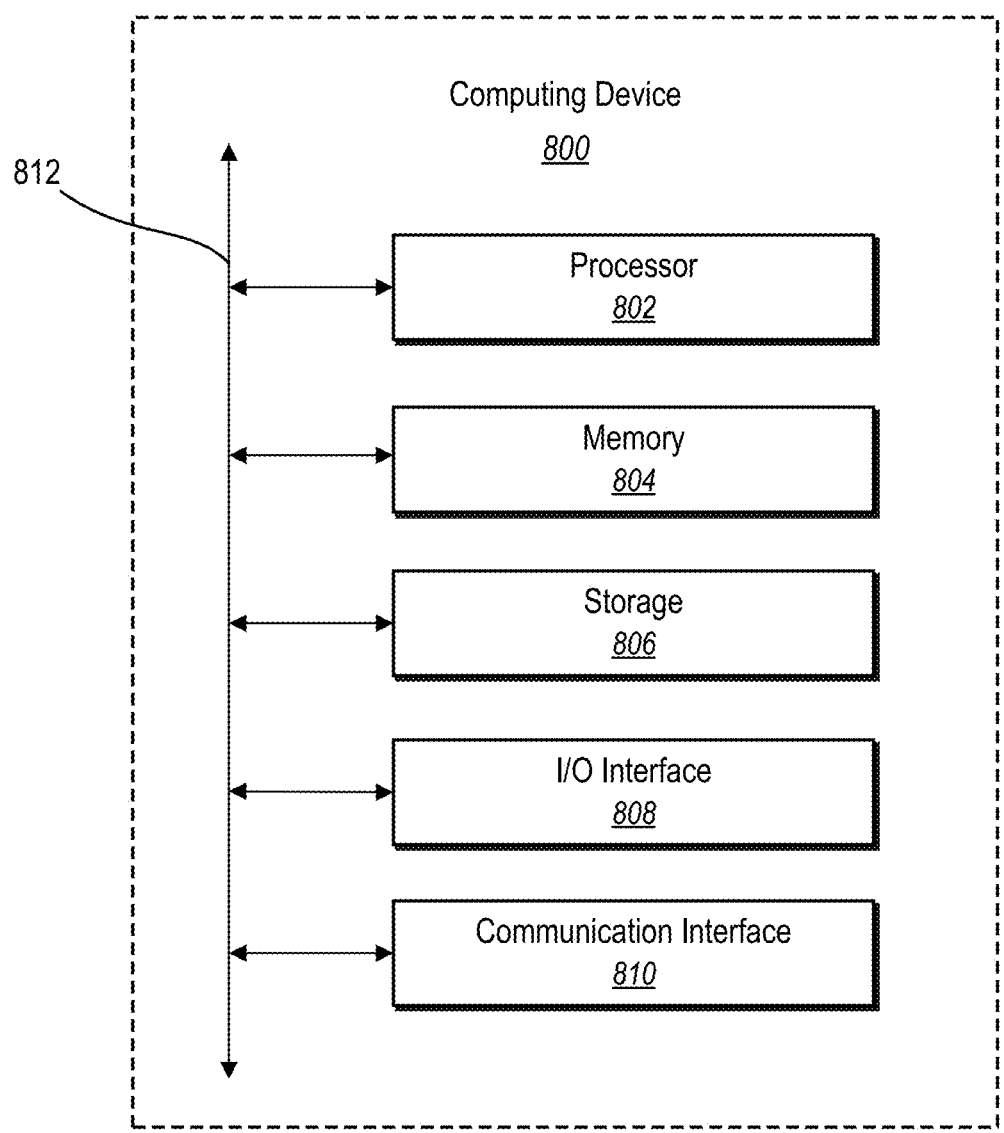
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining, utilizing a natural language processing model, a plurality of tasks associated with editing digital content items in a digital content editing application from a plurality of tutorial content items by determining that the plurality of tasks relate to utilizing a plurality of digital editing tools to edit the digital content items in the digital content editing application;
   determining, from the plurality of tutorial content items utilizing the natural language processing model, a plurality of task matters indicating subject categories in digital media corresponding to the plurality of tasks associated with editing the digital content items;
   generating a digital knowledge graph comprising a plurality of nodes corresponding to the plurality of tasks and the plurality of task matters in the digital media connected via a plurality of edges indicating relationships between the plurality of nodes;
   determining, via a client device, contextual information associated with editing a digital content item within the digital content editing application; and
   generating, utilizing the digital knowledge graph and a task prediction model, a recommendation comprising a digital resource item to provide for display at the client device according to the contextual information in connection with the digital content item being edited within the digital content editing application at the client device.

2. The computer-implemented method as recited in claim 1, further comprising:
   determining a plurality of context signals indicating characteristics of a digital editing environment in which the plurality of tasks are performed from the plurality of tutorial content items; and
   adding nodes corresponding to the plurality of context signals within the digital knowledge graph according to the plurality of tutorial content items.

3. The computer-implemented method as recited in claim 1, further comprising:
   determining, based on the plurality of tutorial content items, a plurality of document types associated with documents in which the plurality of tasks are performed; and
   adding nodes corresponding to the plurality of document types to the digital knowledge graph according to the plurality of tutorial content items.

4. The computer-implemented method as recited in claim 1, further comprising:
   determining, based on the plurality of tutorial content items, the plurality of digital editing tools for performing the plurality of tasks within the digital content editing application; and
   adding nodes corresponding to the plurality of digital editing tools to the digital knowledge graph according to the plurality of tutorial content items.

5. The computer-implemented method as recited in claim 1, wherein determining the plurality of tasks comprises:
   determining, utilizing a text-based classifier on the plurality of tutorial content items, a first subset of tutorial content items corresponding to a first task category and a second subset of tutorial content items corresponding to a second task category; and
   generating the digital knowledge graph based on the first subset of tutorial content items.

6. The computer-implemented method as recited in claim 1, further comprising generating a subgraph associated with the digital knowledge graph comprising an additional set of nodes corresponding to a plurality of digital resource items and the plurality of tasks via an additional set of edges indicating relationships between the additional set of nodes.

7. The computer-implemented method as recited in claim 6, wherein generating the recommendation comprising the digital resource item comprises:
   determining a predicted task by utilizing the task prediction model on the digital knowledge graph; and
   generating the recommendation comprising the digital resource item based on the subgraph associated with the digital knowledge graph and the predicted task.

8. The computer-implemented method as recited in claim 7, wherein determining the predicted task comprises:
   determining the contextual information associated with editing the digital content item by determining context data indicating characteristics of a digital editing environment of the digital content editing application for generating a digital content item at the client device; and
   determining the predicted task by utilizing the task prediction model on the digital knowledge graph with the context data.

9. The computer-implemented method as recited in claim 1, wherein generating the recommendation comprising the digital resource item comprises determining a recommended tutorial content item from the plurality of tutorial content items to provide for display at the client device.

10. The computer-implemented method as recited in claim 1, wherein generating the recommendation comprising the digital resource item comprises determining a recommended digital asset from a database of digital assets to insert into a digital content item generated at the client device.

11. A system, comprising:
    one or more memory devices comprising a plurality of tutorial content items; and
    one or more processors configured to cause the system to:
    determine, utilizing a natural language processing model, a plurality of tasks associated with editing digital content items in a digital content editing application from the plurality of tutorial content items by determining that the plurality of tasks relate to utilizing a plurality of digital editing tools to edit the digital content items in the digital content editing application;
    determine, from the plurality of tutorial content items utilizing the natural language processing model, a plurality of task matters indicating subject categories in digital media corresponding to the plurality of tasks associated with editing the digital content items;
    determine, based on the plurality of tutorial content items, a plurality of document types associated with documents in which the plurality of tasks are performed;
    generate a digital knowledge graph comprising a plurality of nodes corresponding to the plurality of tasks, the plurality of task matters in the digital media, and the plurality of document types connected via a plurality of edges indicating relationships between the plurality of nodes according to the plurality of tutorial content items;
    determine, via a client device, contextual information associated with editing a digital content item within the digital content editing application; and
    generate, utilizing the digital knowledge graph and a task prediction model, a recommendation comprising a tutorial content item from the plurality of tutorial content items to provide for display at the client device according to the contextual information in connection with the digital content item being edited within the digital content editing application at the client device.

12. The system as recited in claim 11, wherein the one or more processors are further configured to cause the system to generate the recommendation comprising the tutorial content item by:
    determining a predicted task of the plurality of tasks by utilizing the task prediction model on the digital knowledge graph; and
    selecting the tutorial content item from the plurality of tutorial content items based on the predicted task.

13. The system as recited in claim 12, wherein the one or more processors are further configured to cause the system to:
    generate a subgraph associated with the digital knowledge graph comprising nodes corresponding to a plurality of digital resource items and the plurality of tasks; and
    select the tutorial content item from the plurality of digital resource items utilizing the predicted task and the subgraph associated with the digital knowledge graph.

14. The system as recited in claim 11, wherein the one or more processors are further configured to cause the system to generate the recommendation comprising the tutorial content item by selecting the tutorial content item to recommend from a ranked set of tutorial content items corresponding to the plurality of tasks.

15. The system as recited in claim 11, wherein the one or more processors are further configured to:
    determine, from the plurality of tutorial content items, a plurality of context signals indicating characteristics of a digital editing environment in which the plurality of tasks are performed; and
    generate the digital knowledge graph based further on the plurality of context signals.

16. The system as recited in claim 15, wherein the one or more processors are further configured to generate the recommendation of the tutorial content item by:
    determining the contextual information associated with editing the digital content item by determining context data associated with one or more user inputs to the digital content editing application at the client device; and
    determining the tutorial content item based on the context data associated with the one or more user inputs and the digital knowledge graph.

17. The system as recited in claim 16, wherein the one or more processors are further configured to:
    determine first feature representations based on the plurality of nodes in the digital knowledge graph;
    determine second feature representations based on the context data associated with the one or more user inputs; and
    determine the tutorial content item based on the first feature representations and the second feature representations.

18. A non-transitory computer readable storage medium comprising instructions that, when executed by at least one processor, cause a computing device to:
    generate, from a plurality of tutorial content items, a digital knowledge graph comprising a first set of nodes corresponding to a plurality of tasks relating to utilizing a plurality of digital editing tools to edit digital content items in a digital content editing application and a plurality of task matters indicating subject categories in digital media corresponding to the plurality of tasks, the first set of nodes connected via a first set of edges indicating relationships between the first set of nodes;
    generate a subgraph associated with the digital knowledge graph comprising a second set of nodes corresponding to a plurality of digital resource items and the plurality of tasks connected via a second set of edges indicating relationships between the second set of nodes;
    determine, via a client device, contextual information associated with editing a digital content item within the digital content editing application; and
    generate a recommendation comprising a digital resource item to provide for display at the client device utilizing the digital knowledge graph and the subgraph associated with the digital knowledge graph according to the contextual information in connection with the digital content item being edited within the digital content editing application at the client device.

19. The non-transitory computer readable storage medium as recited in claim 18, further comprising instructions that, when executed by the at least one processor, cause the computing device to generate the digital knowledge graph by:
    generating the first set of nodes corresponding to the plurality of tasks and the plurality of task matters by utilizing a natural language processing model to extract the plurality of tasks and the plurality of task matters from text or metadata in the plurality of tutorial content items; and
    generating the first set of edges by extracting the relationships between the plurality of tasks and the plurality of task matters from the plurality of tutorial content items.

20. The non-transitory computer readable storage medium as recited in claim 18, further comprising instructions that, when executed by the at least one processor, cause the computing device to generate the recommendation comprising the digital resource item by:
    determining the contextual information associated with editing a digital content item by determining context data from one or more user inputs during execution of the digital content editing application at the client device;
    generating a predicted task based on the context data and the digital knowledge graph; and
    generating the recommendation comprising the digital resource item based on the predicted task and the subgraph associated with the digital knowledge graph.

* * * * *